(12) United States Patent
Miura

(10) Patent No.: US 9,008,979 B2
(45) Date of Patent: Apr. 14, 2015

(54) TOTAL ENERGY QUANTITY CONTROLLING DEVICE AND METHOD

(75) Inventor: Mayumi Miura, Tokyo (JP)

(73) Assignee: Azbil Corporation, Tokyo (JP)

( * ) Notice: Subject to any disclaimer, the term of this patent is extended or adjusted under 35 U.S.C. 154(b) by 561 days.

(21) Appl. No.: 13/270,415

(22) Filed: Oct. 11, 2011

(65) Prior Publication Data

US 2012/0095708 A1    Apr. 19, 2012

(30) Foreign Application Priority Data

Oct. 14, 2010   (JP) ................................. 2010-231694

(51) Int. Cl.
*G01R 21/00*    (2006.01)
*G05D 3/12*    (2006.01)
*G01R 11/56*    (2006.01)
*G06Q 10/06*    (2012.01)

(52) U.S. Cl.
CPC .................................... *G06Q 10/063* (2013.01)

(58) Field of Classification Search
CPC .... G05B 17/02; G01R 21/33; G01R 19/2513; G01R 21/001; G01R 21/1331; G06F 1/28; G06F 2217/78; G06Q 50/06; G06Q 1/3203
USPC .................. 702/60, 57, 65, 81, 84, 127, 182, 702/188–189; 700/286, 291, 295; 705/412; 703/18; 340/870.02
See application file for complete search history.

(56) References Cited

U.S. PATENT DOCUMENTS

| | | | |
|---|---|---|---|
| 7,373,221 B2 * | 5/2008 | Lal ................................. | 700/291 |
| 7,705,484 B2 * | 4/2010 | Horst .............................. | 307/35 |
| 8,131,403 B2 * | 3/2012 | Forbes et al. ................. | 700/295 |
| 8,364,609 B2 * | 1/2013 | Ozog ............................. | 705/412 |
| 8,396,608 B2 * | 3/2013 | Subbloie ....................... | 700/296 |
| 2004/0220702 A1 * | 11/2004 | Matsubara et al. ........... | 700/291 |
| 2005/0015283 A1 * | 1/2005 | Iino et al. .......................... | 705/4 |

(Continued)

FOREIGN PATENT DOCUMENTS

| | | |
|---|---|---|
| JP | 2003-256738 | 9/2003 |
| JP | 2004-280618 A | 10/2004 |
| JP | 2005-234746 | 9/2005 |

OTHER PUBLICATIONS

T. Takahashi, et al., Net Enercare-e'—An Energy Controlling Service Supporting the Revised Energy Conservation Act, Hitachi Hyoron, vol. 92, No. 03, pp. 26-29, Mar. 2010.

(Continued)

*Primary Examiner* — Toan Le
(74) *Attorney, Agent, or Firm* — Troutman Sanders LLP

(57) ABSTRACT

A total energy quantity controlling device has a calculation data generating portion for defining, as calculation data, data for the amount of energy used for a processing energy type at a processing location for a processing month in a processing fiscal year, if this data is confirmed, or substitute data if this data for the amount of energy used is not confirmed; a substitute data determining portion for determining the substitute data; a data calculation processing portion for using the calculation data to calculate an aggregate value for the amount of energy used; a substitution rate calculating portion for calculating a substitution rate that is the use rate of the substitute data or the confirmed data within the aggregate value for the amount of energy used; and a displaying portion for displaying the aggregate value for the amount of energy used and the use rate.

12 Claims, 22 Drawing Sheets

(56) References Cited

U.S. PATENT DOCUMENTS

| | | | |
|---|---|---|---|
| 2007/0094043 A1* | 4/2007 | Bannai et al. | 705/1 |
| 2007/0239317 A1* | 10/2007 | Bogolea et al. | 700/276 |
| 2007/0244604 A1* | 10/2007 | McNally | 700/291 |
| 2010/0049371 A1* | 2/2010 | Martin | 700/291 |
| 2011/0071882 A1* | 3/2011 | Jakagnanam et al. | 705/10 |
| 2011/0184575 A1* | 7/2011 | Kawamoto et al. | 700/292 |
| 2011/0190951 A1* | 8/2011 | Lee | 700/291 |
| 2011/0224927 A1* | 9/2011 | Tsuruta et al. | 702/61 |
| 2011/0231028 A1* | 9/2011 | Ozog | 700/291 |
| 2011/0251933 A1* | 10/2011 | Egnor et al. | 705/30 |
| 2012/0078404 A1* | 3/2012 | Saito et al. | 700/97 |
| 2012/0084030 A1* | 4/2012 | Kitagawa et al. | 702/61 |

OTHER PUBLICATIONS

Japanese Office Action dated Feb. 18, 2014, from corresponding Japanese Application No. 2010-231694.

* cited by examiner

FIG. 3

| Month in Fiscal Year | Cumulative Total Energy Quantity (t - $CO_2$) | Cumulative Total Substitute Data Quantity (t - $CO_2$) | Substitution Rate (%) |
|---|---|---|---|
| April (Month 4) | 100 | 0 | 0 |
| May (Month 5) | 220 | 0 | 0 |
| June (Month 6) | 400 | 0 | 0 |
| July (Month 7) | 620 | 0 | 0 |
| August (Month 8) | 1020 | 40 | 4 |
| September (Month 9) | 1320 | 100 | 8 |
| October (Month 10) | 1540 | 210 | 14 |
| November (Month 11) | 1690 | 360 | 21 |
| December (Month 12) | 1790 | 460 | 26 |
| January (Month 1) | 1880 | 550 | 29 |
| February (Month 2) | 1950 | 625 | 32 |
| March (Month 3) | 2040 | 700 | 35 |

FIG. 5

| Month in Fiscal Year | Monthly Total Energy Quantity (t - $CO_2$) | Monthly Total Substitute Data Quantity (t - $CO_2$) | Substitution Rate (%) |
|---|---|---|---|
| April (Month 4) | 100 | 0 | 0 |
| May (Month 5) | 220 | 0 | 0 |
| June (Month 6) | 400 | 0 | 0 |
| July (Month 7) | 620 | 0 | 0 |
| August (Month 8) | 1020 | 40 | 10 |
| September (Month 9) | 1320 | 60 | 20 |
| October (Month 10) | 1540 | 110 | 50 |
| November (Month 11) | 1690 | 150 | 100 |
| December (Month 12) | 1790 | 100 | 100 |
| January (Month 1) | 1880 | 90 | 100 |
| February (Month 2) | 1950 | 75 | 100 |
| March (Month 3) | 2040 | 85 | 100 |

FIG. 8

| Month in Fiscal Year | Cumulative Total Energy Quantity Upper Limit (t - CO$_2$) | Cumulative Total Substitute Data Quantity Upper Limit (t - CO$_2$) | Upper Limit Substitution Rate (%) | Cumulative Total Energy Quantity Lower Limit (t - CO$_2$) | Cumulative Total Substitute Data Quantity Lower Limit (t - CO$_2$) | Lower Limit Substitution Rate (%) |
|---|---|---|---|---|---|---|
| April (Month 4) | 100 | 0 | 0 | 100 | 0 | 0 |
| May (Month 5) | 220 | 0 | 0 | 220 | 0 | 0 |
| June (Month 6) | 400 | 0 | 0 | 400 | 0 | 0 |
| July (Month 7) | 620 | 0 | 0 | 620 | 0 | 0 |
| August (Month 8) | 1020 | 40 | 4 | 1004 | 24 | 2 |
| September (Month 9) | 1320 | 100 | 8 | 1286 | 66 | 5 |
| October (Month 10) | 1540 | 210 | 14 | 1492 | 162 | 11 |
| November (Month 11) | 1690 | 360 | 21 | 1597 | 267 | 17 |
| December (Month 12) | 1790 | 460 | 26 | 1682 | 352 | 21 |
| January (Month 1) | 1880 | 550 | 29 | 1745 | 415 | 24 |
| February (Month 2) | 1950 | 625 | 32 | 1812 | 482 | 27 |
| March (Month 3) | 2040 | 700 | 35 | 1872 | 542 | 29 |

Fiscal Year Y: Cumlative Total Energy Quantity (Equivalent $CO_2$ Emission Quantity)

FIG. 13

Please select substitute data determining method:

☐ Data from the previous month.
☑ Data from the same month in the previous year.
☐ Ave. for the same month for the last 3 years.
☐ Data with the same trend in the past.

Cancel    OK

FIG. 15

Control Group Setup Screen
  Setup procedure:
  Input group name.
  → Use the mouse to select the locations to register (the list on the left)
  → Select the substitute data determining method to be applied to the group (the list on the right)

Ⅰ. Group Name: Business Locations for the Energy Conservation Measures for Fiscal Year XX Ⅱ. Select Locations to Register Ⅲ. Select Substitute Data Determining Method

| Locations | Methods |
  |---|---|
  | Headquarters Building<br>A: Branch<br>B: Branch<br>C: Sales Office<br>D: Sales Office<br>E: Hotel<br>F: Factory<br>G: Factory<br>H: Factory | • Data for the same month of the previous year.<br>• Average value for the same month from the previous year, the previous month, and the following month.<br>• Upper limit value for the same month from the previous year, the previous month, and the following month<br>• Search for year and month with similar data |

[ Cancel ]   [ OK ]

FIG. 16 – Prior Art
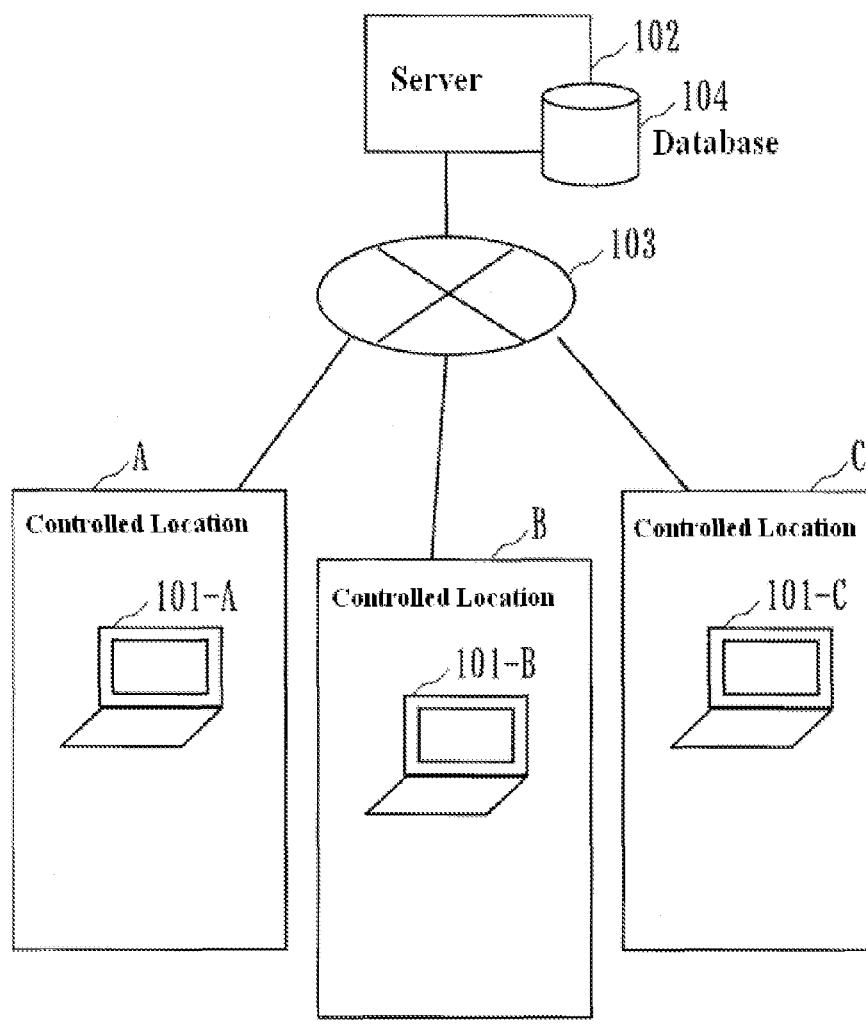

FIG. 17 – Prior Art

|  | Type of Controlled Energy | | | |
|---|---|---|---|---|
|  | Elect. | Gas | Oil | .. |
| 2009.4 | ☐ | ☐ | ☐ | .. |
| 2009.5 | ☐ | ☐ | ☐ | .. |
| 2009.6 | ☐ | ☐ | ☐ | .. |
| 2009.7 | ☐ | ☐ | ☐ | .. |
| 2009.8 | ☐ | ☐ | ☐ | .. |
| 2009.9 | ☐ | ☐ | ☐ | .. |
| : | : | : | : | : |
| 2010.3 | ☐ | ☐ | ☐ | .. |

(Year and Month)

FIG. 18 (A)

Data for Controlled Location A

|  | Elec. | Gas | Oil | · · | Location A, Monthly Total Energy Quantity |
|---|---|---|---|---|---|
| : | : | : | : | : | : |
| 2009.6 | | | | · · | |
| 2009.7 | | | | · · | |
| 2009.8 | | | | · · | |
| 2009.9 | | | | · · | |
| : | : | : | : | : | : |

Data for Controlled Location B

|  | Elec. | Gas | Oil | · · | Location B, Monthly Total Energy Quantity |
|---|---|---|---|---|---|
| : | : | : | : | : | : |
| 2009.6 | | | | · · | |
| 2009.7 | | | | · · | |
| 2009.8 | | | | · · | |
| 2009.9 | | | | · · | |
| : | : | : | : | : | : |

Data for Controlled Location C

| Year and Month | Total Monthly Energy Quantity | Cumulative Total Energy Quantity |
|---|---|---|
| 2009.4 | XX | XX |
| 2009.5 | XX | XX |
| 2009.6 | XX | XX |
| 2009.7 | XX | XX |
| 2009.8 | XX | XX |
| 2009.9 | XX | XX |
| 2009.10 | XX | XX |
| 2009.11 | XX | XX |
| 2009.12 | XX | XX |
| 2010.1 | XX | XX |
| 2010.2 | XX | XX |
| 2010.3 | XX | Etotal |

FIG. 19

|  | Type of Controlled Energy | | | |
|---|---|---|---|---|
| Year and Month | Elect. | Gas | Oil | .. |
| 2009.4 | ☐ | ☐ | ☐ | .. |
| 2009.5 | ☐ | ☐ | ☐ | .. |
| 2009.6 | ☐ | ☐ | ☐ | .. |
| 2009.7 | ☐ | ■ | ☐ | .. |
| 2009.8 | ☐ | ■ | ■ | .. |
| 2009.9 | ■ | ■ | ■ | .. |
| : | : | : | : | : |
| 2010.3 | ■ | ■ | ■ | .. |

FIG. 20 (A)

Data for Controlled Location A

| | Elec. | Gas | Oil | ·· | Location A, Monthly Total Energy Quantity |
|---|---|---|---|---|---|
| 2009.6 | | | | ·· | |
| 2009.7 | | | | ·· | |
| 2009.8 | | | | ·· | |
| 2009.9 | | ■ | ■ | ·· | |

Data for Controlled Location B

| | Elec. | Gas | Oil | ·· | Location B, Monthly Total Energy Quantity |
|---|---|---|---|---|---|
| 2009.6 | | | | ·· | |
| 2009.7 | | ■ | | ·· | |
| 2009.8 | ■ | ■ | | ·· | |
| 2009.9 | ■ | ■ | ■ | ·· | |

FIG. 20 (B)

| Year and Month | Total Monthly Energy Quantity | Cumulative Total Energy Quantity |
|---|---|---|
| 2009.4 | XX | XX |
| 2009.5 | XX | XX |
| 2009.6 | XX | Eend |
| 2009.7 | --- | --- |
| 2009.8 | --- | --- |
| 2009.9 | --- | --- |
| 2009.10 | --- | --- |
| 2009.11 | --- | --- |
| 2009.12 | --- | --- |
| 2010.1 | --- | --- |
| 2010.2 | --- | --- |
| 2010.3 | --- | --- |

TOTAL ENERGY QUANTITY CONTROLLING DEVICE AND METHOD

CROSS REFERENCE TO RELATED APPLICATIONS

The present application claims priority under 35 U.S.C. §119 to Japanese Patent Application No. 2010-231694, filed Oct. 14, 2010, which is incorporated herein by reference.

FIELD OF TECHNOLOGY

The present invention relates to a total energy quantity controlling device and method for facilitating the control of the total quantity of energy used at a plurality of locations.

BACKGROUND

Given the revision to the Act on Temporary Measures for Promotion of Rational Uses of Energy and Recycled Resources in Business Activities enacted in April 2010, that which is subject to regulation has changed from business location units, such as factories and buildings, to business (company) units that include a plurality of business locations. As a result, if the total amount of energy used annually throughout in a company, such as in its headquarters, its factories, its branches, its business locations, and the like, exceeds a crude-oil equivalent of 1500 kL, then that company will be under obligation to file reports. Companies that are subject to the Act on Temporary Measures for Promotion of Rational Uses of Energy and Recycled Resources in Business Activities typically are subject to obligations for reporting under the Law Concerning the Promotion of the Measures to Cope with Global Warming as well. These companies must establish long-term plans for reducing energy consumption, record and archive amounts of energy used monthly, tabulate results, and file periodic reports. It is necessary for these companies to be able to know the amounts of energy used at a plurality of geographically separated locations in order to control the total amount of energy used. Moreover, if a firm is unable to achieve reduction targets, then it may be subject to civil penalties under local regulations, and may experience a loss in corporate value from the perspective of corporate social responsibility (CSR).

Conventionally, typically the system for controlling the total amount of energy used has been a total energy use controlling system wherein individuals at each individual business location would input, from an inputting screen of a web-based system, monthly data for the amount of energy used (electricity, gas, etc.), where these data would be collected and controlled in a database on a server, to provide trends in the amount of energy used at individual locations or in all locations together (See, for example, Takahashi, Tatsunori, et al.: "'Net Enercare-e'—An Energy Controlling Service Supporting the Revised Energy Conservation Act," Hitachi Hyoron, Vol. 92, No. 03, p. 26-29, March 2010).

FIG. 16 shows an overview of a typical web-based energy use controlling system. The energy use controlling system is structured from: terminal devices 101-A through 101-C provided at individual controlled locations A through C, such as the headquarters, factories, branches, business locations, retail locations, and the like; a server 102 that is provided at, for example, a control center; and the Internet 103, which is a network for connecting the terminal devices 101-A through 101-C and the server 102. As illustrated in FIG. 16, when data for the amount of energy used by each of the controlled locations are inputted into the terminal devices 101-A through 101-C, based primarily on workers at the individual controlled locations A-C looking at the meters, and on invoices, the data for the amount of energy used are stored in a database 104 of the server 102 through the Internet 103.

While there are also cases wherein data on the amount of energy used is collected automatically through measurement equipment such as electric meters in each of the controlled locations A through C, regardless of whether the data is collected manually or automatically, the data for all of the controlled locations are stored in a server 102 so as to make it possible for the individual in the firm with responsibility for environmental control (hereinafter termed the "total quantity administrator") to review the compiled results. A comparison of the monthly or yearly energy use reduction target values (hereinafter termed "target values") to the actual results for the amounts of energy use can be viewed in graphic displays, or the like, in a controlling screen for the total quantity administrator, displayed by the server 102.

The total quantity administrator controls each of the locations through, for example, comparing the total calculated value for the amounts of energy used in each of the controlled locations to the target values for the amount of energy used that month, and directing energy reductions in the various controlled locations if it is determined that the target values for the amount of energy used throughout the year will be exceeded, to control each location so that the amounts of energy used throughout the year will be no more than the target values. While the data on the amounts of energy used are collected through employees at each of the controlled locations inputting the data or through measurements by measuring devices, as described above, an energy controlling system has also been proposed wherein energy-related information that is not measured is inferred through analysis of other measurement information (See, for example, Japanese Unexamined Patent Application Publication 2004-280618).

In a location of a small scale, or a location wherein a tenant resides, or the like, there are cases wherein implementation of measurement devices or systems for collecting management data automatically into the server is not possible due to high implementation costs, and cases wherein the provision of a system would be difficult due to problems in compatibility with existing equipment, and thus there are many cases wherein the employees at the individual controlled locations input manually the amounts of energy used each month, based on meter readout reports or invoices. However, the timing with which the distribution of meter readout reports or invoices, or the like, for electricity, gas, and the like, are different for each business location, and, in particular, in a location wherein there is tenant occupancy, the invoices from the tenant owners will not necessarily be issued the following month, but there are also cases wherein, for example, they are not issued until three months have elapsed.

The data that is checked will be described hereafter. In a conventional systems, it is not possible to collect the total amount of energy used (hereinafter termed "the total energy quantity") in a given month until all of the amounts of energy used in all of the controlled locations have been confirmed by the total quantity administrators, and thus there is a problem in that the evaluation as to whether or not there is a likelihood that the yearly target value will be exceeded by the total energy quantity will be delayed. When this leads to a delay in researching and implementing countermeasures, there will be a high likelihood that it will not be possible to keep the total amounts of energy used in a year to with in the target values.

The conventional problem area will be described in greater detail below. FIG. 17 illustrates an abstracted image of the energy usage quantity data for fiscal 2009, collected for an arbitrary location X. In the example in FIG. 17, the data regarding the amount of energy used are shown with squares rather than specific numbers. As is clear from this example, the usage quantity data for each month is stored in the server for the controlled energy types, for the controlled locations.

FIG. 18(A) is a diagram illustrating an example of the amount of energy used for each controlled location, where FIG. 18(B) is a diagram illustrating an example of the total energy quantity wherein the energy use quantities of the individual controlled locations have been summed together. In FIG. 18(B), the total energy quantity for each month is calculated by summing, for each month, the amounts of energy used by each of the controlled locations, and it can be seen that the total energy quantities for the individual months are summed to calculate a yearly total cumulative energy quantity Etotal for the year. There is a need to control energy usage so that this total cumulative energy quantity Etotal will not exceed the yearly energy use quantity target values.

FIG. 19 is a diagram illustrating an example wherein undetermined data is included in the data on the amount of energy used in fiscal 2009 at a location X. For simplicity in the explanation, the controlled energy types will be limited to only electricity, gas, and oil. In the example in FIG. 19, the white squares indicate confirmed data and the black squares indicate non-confirmed data. In this example, the data for September 2009 onward is non-confirmed, and in the data for August 2009, only electricity is confirmed, where, in the data for July 2009, only oil is confirmed, where all of the data is confirmed in June 2009 and earlier. In this case, the data subject to calculation in total quantity control in the prior art would be only those months wherein all of the data has been confirmed. That is, in the example in FIG. 19, it would be from April 2009 until the last month wherein there is data that is completely confirmed (hereinafter termed the "last confirmed month"), which is data up to June 2009.

FIG. 20(A) is a diagram illustrating an example wherein non-confirmed data is included in the energy usage quantity in each controlled location, and FIG. 20(B) is a diagram illustrating a case of a total energy quantity wherein the energy use quantities of each of the controlled locations have been summed. For simplicity in the explanation, let us assume only two controlled locations A and B, with only electricity, gas, and oil as the controlled energy types. In the example in FIG. 20(A), the white squares indicate confirmed data and the black squares indicate non-confirmed data.

If, as in the example in FIG. 20(A), the last confirmed month in the controlled location A is August and the last confirmed month for controlled location B is June 2009, then, in the conventional system, the last month for which the total quantity is calculated by compiling the total quantity control data would be June 2009, where the monthly data for both of the controlled locations A and B are confirmed. Regardless of the data for July 2009 and the data for August 2009 in controlled location A being confirmed, these confirmed data are not used. As described above, there is a variety of variation in the timing with which data is confirmed, depending on the controlled location, the type of energy, and the like, and, in particular, for a location wherein a tenant resides, invoices are not necessarily issued from a tenant owner the following month, but, for example, there are also cases wherein they are not issued until after three months.

The total quantity administrator needs to be able to discover as quickly as possible situations wherein total energy quantity targets may not be achieved (wherein the actual value for the total energy quantity will exceed the reduction target value), to establish the required countermeasures as quickly as possible. However, in the conventional system, it is not possible to compile the total energy quantities for a given month until all of the energy usage quantities for all of the controlled locations are confirmed, and thus there may be delays in evaluating whether or not the yearly conservation target values will be exceeded, due to delays in understanding the total energy quantities for a given month. In the conventional system, in the case of the data illustrated in FIG. 20, often the actual values for the total energy quantities for each month of the prior fiscal year are displayed as reference values for July 2009 and forward, in the case of the data illustrated in FIG. 20. However, even if, for example, there were one location wherein the amount of energy usage was small, if even only that is not confirmed, the calculation process would not be performed regardless of the total energy quantity for the month being essentially established.

The present invention is to solve the problem set forth above, and the object thereof is to provide a total energy quantity controlling device and method able to reduce the probability that a total energy quantity target will not be met, through using substitute data to calculate the total amount of energy used if there is unconfirmed data in the amount of energy used.

SUMMARY

A total energy quantity controlling device according to the present invention includes: calculation data generating means for defining, as calculation data, data for the amount of energy used for a processing energy type at a processing location for a processing month in a processing fiscal year, if this data is confirmed, or substitute data if this data for the amount of energy used is not confirmed; substitute data determining means for determining the substitute data; data calculation processing means for using the calculation data to calculate an aggregate value for the amount of energy used; substitution rate calculating means for calculating a substitution rate that is the use rate of the substitute data or the confirmed data within the aggregate value for the amount of energy used; and displaying means for displaying the aggregate value for the amount of energy used and the use rate. Moreover, as one structural example of a total energy quantity controlling device according to the present invention, the substitute data determining means determine the substitute data based on an amount of energy used in the past at a processing location. Moreover, as one structural example of a total energy quantity controlling device according to the present invention, the substitute data determining means determine the substitute data based on confirmed data for the amount of energy used at a processing location for the month prior to the processing month of the processing fiscal year, and/or confirmed data for the amount of energy used at a processing location for the processing month in the year prior to the processing fiscal year.

Moreover, as one structural example of a total energy quantity controlling device according to the present example, the substitute data determining means not only determine, as upper-limit substitute data, the maximum value of the amount of energy used in the past for the processing location, but also determine, as lower-limit substitute data, the minimum value of the amount of energy used in the past for the processing location; the calculation data generating means generate upper-limit calculation data using the upper-limit substitute data and lower-limit calculation data using the lower-limit substitute data; the data calculation processing means calculate aggregate values for the amounts of energy used for the upper-limit calculation data and the lower-limit calculation data separately; and the substitution rate calculating means calculate an upper-limit substitution rate that is the use rate of the upper-limit substitute data in the aggregate value for the amount of energy used that was calculated using the upper-limit calculation data, and calculate a lower-limit substitution rate that is the use rate of the lower-limit substitute data in the aggregate value for the amount of energy used that was calculated using the lower-limit calculation data. Moreover, as one structural example of a total energy quantity controlling device according to the present invention, the substitute data determining means, if there is confirmed data for another type of energy for the processing location for the processing month for the processing fiscal year when determining substitute data for a processing energy type for a processing location, for a processing month for a processing fiscal year, retrieves a past year and month wherein the amount of energy used in the processing location for the other type of energy is similar, and uses, as the substitute data, confirmed data for the amount of energy used for the processing energy type, for the year and month that has been retrieved.

Moreover, one structural example of a total energy quantity controlling device according to the present invention further includes substitute data determining method storing means for storing information for the substitute data determining method selected by a total quantity administrator; wherein: the substitute data determining means are able to select a substitute data determining method to be used, in accordance with information stored in the substitute data determining method storing means. Moreover, one structural example of a total energy quantity controlling device according to the present invention further has group setup storing means for storing information for a processing group, selected by a total quantity administrator, and information for a substitute data determining method selected for that group by the total quantity administrator; wherein: the calculation data generating means, the substitute data determining means, the data calculation processing means, the substitution rate calculating means, and the displaying means perform processing on a processing location group, by the selected substitute data determining method, in accordance with information stored in the group setup storing means.

A total energy quantity controlling method according to the present invention includes a calculation data generating step for defining, as calculation data, data for the amount of energy used for a processing energy type at a processing location for a processing month in a processing fiscal year, if this data is confirmed, or substitute data if this data for the amount of energy used is not confirmed; a substitute data determining step for determining the substitute data during the calculation data generating step; a data calculation processing step for using the calculation data to calculate an aggregate value for the amount of energy used; a substitution rate calculating step for calculating a substitution rate that is the use rate of the substitute data or the confirmed data within the aggregate value for the amount of energy used; and a displaying step for displaying the aggregate value for the amount of energy used and the use rate.

Given the examples, substitute data is generated by the substitute data determining means even if the amount of energy used has non-confirmed data when the total quantity administrator confirms the data or the total energy quantity, thus making it possible to use the substitute data to calculate an aggregate value for the amount of energy used. Moreover, in the present examples, a substitution rate, which is the rate of use of substitute data in the calculated value for the amount of energy used, is calculated, and the calculated value for the amount of energy used and the substitution rate are displayed. The result is that the examples facilitates early forecasts as to the possibility of failures to reach targets for total energy use, increasing the likelihood of being able to find countermeasures quickly when a failure to achieve the target is projected.

Additionally, in the present invention the total quantity administrator can forecast flexibly the potential for non-achievement of a target for the total energy quantity, through confirming two types of calculation results, calculated from two types of substitute data for upper and lower limits.

Moreover, in the examples, the substitute data determining means, if there is confirmed data for another type of energy for the processing location for the processing month for the processing fiscal year when determining substitute data for a processing energy type for a processing location, for a processing month for a processing fiscal year, retrieves a past year and month wherein the amount of energy used in the processing location for the other type of energy is similar, and uses, as the substitute data, confirmed data for the amount of energy used for the processing energy type, for the year and month that has been retrieved. The result is that it is possible to improve the reliability of the substitute data through the ability to reduce the probability that aberrant data that depends on a year with a cold winter or a hot summer, or the like, or data for a month with a unique usage conditions, can be used as the substitute data, when compared to the case of defining, as substitute data, confirmed data from the previous month or from the same month in the previous year.

Additionally, the ability of the substitute data determining means to select the substitute data determining method makes it possible for the total quantity administrator to select a substitute data determining method evaluated, based on, for example, past experience with total energy quantity control, as being appropriate in evaluating the amount of energy used at the controlled location. Moreover, there is an increased likelihood of being able to forecast the likelihood of non-achievement of total energy quantity targets more flexibly through comparing results that are displayed through different substitute data determining methods.

Moreover, it is possible to take into account tolerance for risk of non-achievement of targets when forecasting the possibility of non-achievement of the total energy quantity target, through performing processing through the substitute data determining method selected for a group of processing locations.

BRIEF DESCRIPTION OF THE DRAWINGS

FIG. 3 is a diagram illustrating an example wherein the cumulative total energy quantity is displayed in a table in the example.

FIG. 5 is a diagram illustrating an example wherein the monthly total energy quantity is displayed in a table in the example.

FIG. 8 is a diagram illustrating an example wherein a cumulative total energy quantity upper limit and a cumulative total energy quantity are displayed in a table in the other example.

FIG. 13 is a diagram illustrating one example of a selecting screen for the substitute data determining method in the other example.

FIG. 15 is a diagram illustrating one example of a setup screen for a criticality group in the example.

FIG. 16 is a block diagram illustrating a structure for a total energy quantity controlling system.

FIG. 17 is a diagram illustrating an example of energy quantity use data for fiscal 2009 for a single location.

FIGS. 18(A) and 18(B) illustrate examples of amounts of energy used for individual locations that are controlled locations, and the total energy wherein the amounts of energy used for the individual locations that are controlled locations have been totaled.

FIG. 19 is a diagram illustrating an example wherein the energy quantity use data for fiscal 2009 for a single location includes unconfirmed data.

FIGS. 20(A) and 20(B) illustrate examples wherein the amounts of energy used for individual locations that are controlled locations include unconfirmed data, and an example of the total energy wherein the amounts of energy used for the individual locations that are controlled locations have been totaled.

DETAILED DESCRIPTION

Figure 1:
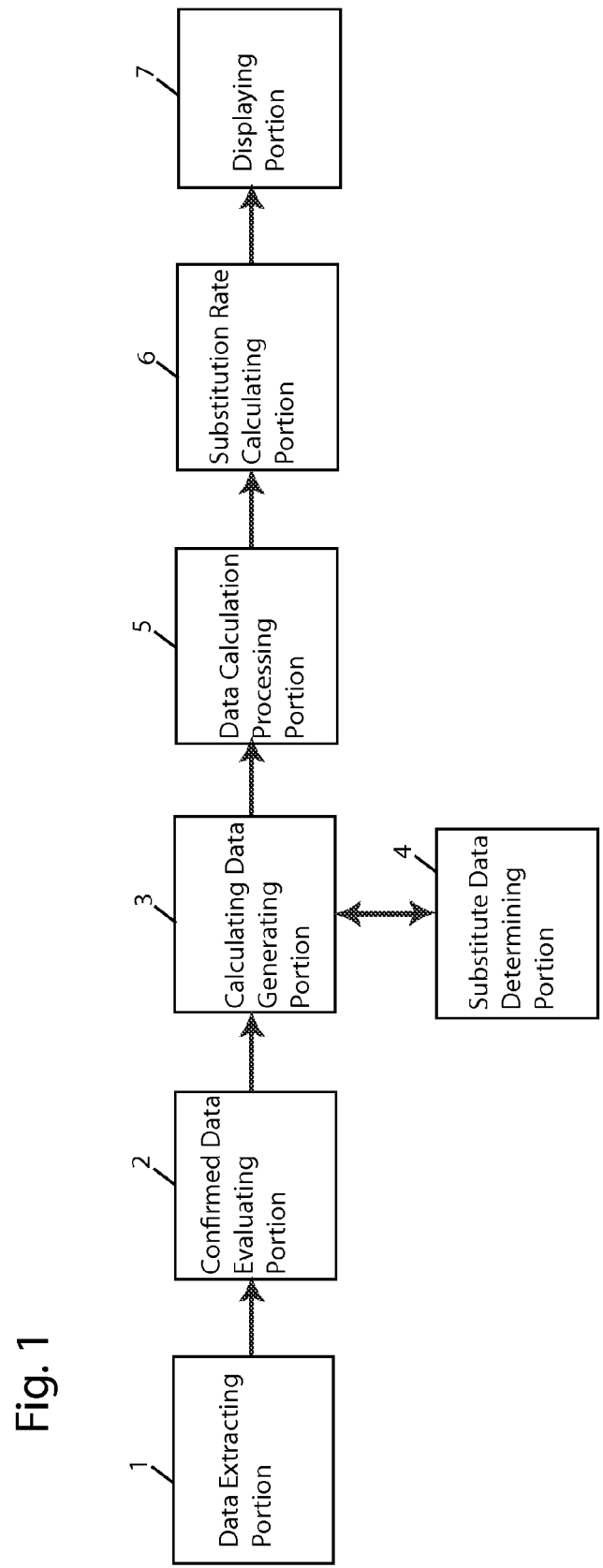
FIG. 1 is a block diagram illustrating a structure of a total energy quantity controlling device according to an example according to the present invention.

Reviewing the appropriate total energy quantity with the timing required by the total quantity administrator makes it possible to confirm in an early stage the possibility of non-achievement of total energy quantity targets, to research properly countermeasures in order to achieve the targets, and to direct countermeasures in the business locations.

In the conventional system, when the total quantity administrator controls the amount of energy used it is not possible to calculate the total energy quantity for the month or the fiscal year when the inputting or confirmation of even a single energy item at a business location has been omitted. However, if the total energy quantity is reviewed by the total quantity administrator with the required timing, and if non-achievement of the total energy quantity target is anticipated, then it is possible to execute countermeasures at an earlier stage, and thus even if estimated values are included in the total energy quantity for the month or for the fiscal year, it is effective to provide total energy quantities whereby it is possible to confirm the ratios of use of estimated values and confirmed values.

Here typically most of the energy consumption in a business location, or the like, is energy consumption for air conditioning and lighting. This energy consumption depends greatly on environmental factors such as the number of hours of lighting, the outside temperature, and the like, that are determined primarily by geographic location, along with design factors such as the floor space, the insulation performance, the area and positioning of open portions, and the like, and on conditions that are unique to the building, such as the type of use in terms of office space, retail space, or the like. Normally there is low probability that there will be any extreme changes in these conditions, and thus, for most energy items, there are seldom extreme changes from actual values from the past.

Consequently, the inventor has focused on the fact that in estimating the amount of energy used it is appropriate to substitute, partially, actual values from the past. That is, the amounts of energy used at individual locations, used in calculations, need not necessarily all be data that have been confirmed. It is possible to review presumptively the possibility of non-achievement of total energy quantity targets through the use of estimated values, based on actual values such as the actual value from the previous month or the value for the same month from the previous year, even if the certainty of the data is reduced.

Consequently, the concept was arrived at that calculating the total energy quantities using estimated substitute data, for those non-confirmed data that are inadequate for calculation, using, to the maximum extent possible, energy use quantity data that have already been confirmed, and then indicating to the total quantity administrator the calculation results together with the proportion with which the substitute data were used, increases the likelihood that it will be possible to evaluate early the potential for non-achievement of total energy quantity targets. Moreover, the total energy administrator being aware of whether or not the proportion of substitute data is high, through the substitute data use proportion being displayed, makes it possible to avoid evaluating the likelihood of non-achievement of total energy quantity targets excessively early.

As described above, the examples are able to facilitate an understanding of the total amount of energy, through the use, to the maximum extent possible, data that has already been confirmed, even if there are data for business locations wherein the amount of energy used is not yet entered or not yet confirmed, making it possible to reduce the probability of non-achievement of targets (wherein the actual value for the total amount of energy exceeds the conservation target value).

Here various examples are explained along with assumed conditions. In a system such as illustrated in FIG. 16, typically the system is one which has an approval function wherein data that is inputted by an operator is subjected to a data confirmation by an administrator who is determined in advance, to be handled, after the approval, as actual values (confirmed data). In the various examples, when data, even if it has been inputted, is not handled as actual values, such as if it is not yet approved or is disallowed, it is all defined as non-confirmed data. That is, in a normal case, in a system that has no approval function, whether data is confirmed data or non-confirmed data is determined by whether or not the data has been inputted. Moreover, in a system that has an approval function, whether the data is confirmed data or non-confirmed data is determined by whether or not the data has been inputted and by whether or not the data has been approved. Whether the data is confirmed data or non-confirmed data normally can be discerned easily from the data and from information in the system that is controlled in association with the data.

The amounts of energy used are normally calculated and controlled with each fiscal year in order to comply with the law. In each form example the explanation will be for a process for an arbitrary fiscal year. The total quantity control for the amount of energy used, in compliance with the revised Law Concerning the Promotion of the Measures to Cope with Global Warming is typically performed through a crude oil-equivalent value or a $CO_2$ emission quantity-equivalent value. In the various forms of embodiment of the present invention, the explanation will use data that has been converted into an equivalent $CO_2$ emission quantity.

In the present example, the amount of energy used is calculated using, for non-confirmed data (data that has not yet been entered or not yet been approved), substitute data based on actual values, and the calculation results are provided, together with the substitute data use proportion, to the total quantity administrator. In the present example, a substitution rate that indicates the ratio of the substitute data is used as the use proportion. Values based on actual results are used as the substitute data. Data based on confirmed data of the previous month or of the same month in the previous year are used as the substitute data. In the present example, calculation is performed, as described above, using all of the confirmed data. In the present example, the explanation is primarily for the most typical example, wherein the cumulative energy use quantity is calculated in the total quantity control of the quantity of energy used.

FIG. 1 is a block diagram illustrating a structure of a total energy controlling device. The total energy quantity controlling device is structured from: a data extracting portion 1; a confirmed data evaluating portion 2; a calculation data generating portion 3; a substitute data determining portion 4; a data calculation processing portion 5; a substitution rate calculating portion 6; and a displaying portion 7. This type of total energy controlling device, in the system in FIG. 16, is provided in a server 102.

The data extracting portion 1 extracts applicable data from the database. The confirmed data evaluating portion 2 evaluates whether or not all of the data extracted by the data extracting portion 1 is confirmed data. The calculation data generating portion 3 generates the data used in the calculation by the data calculation processing portion 5. At this time, for non-confirmed data, substitute data determined by the substitute data determining portion 4 is set as calculation data. The data calculation processing portion 5 performs calculations using the calculation data that has been generated. The substitution rate calculating portion 6 calculates the rate of substitution of the substitute data. The displaying portion 7 displays the data calculation results and the substitution rate.

Figure 2:
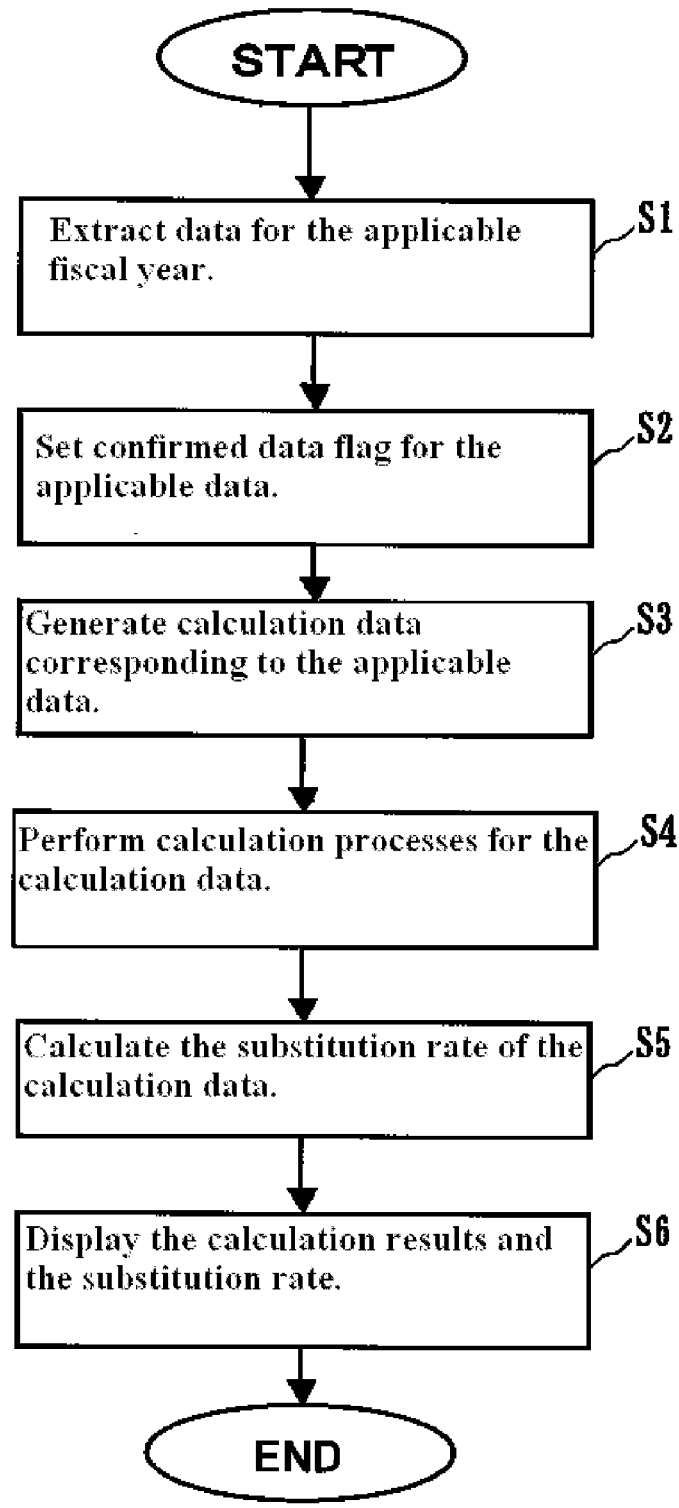
FIG. 2 is a flowchart for explaining the operation of the total energy quantity controlling device according to the example.

The operation of the total energy controlling device according to the present example is explained below. FIG. 2 is a flowchart for explaining the operation of the total energy controlling device. Here data for the amount of energy used, for each controlled location in for each type of energy that are subject to the total energy quantity control are stored in a database 104 of the server 102.

When the data for the amount of energy used corresponding to a year y and month m of a location number p and an energy type number n that are subject to processing is defined as E(i, m, p, n), then if the total quantity administrator has specified Y as the processing fiscal year y, then the data extracting portion 1 will extract the data E(Y, m, p, n) for the amount of energy used from the database 104 of the server 102 (Step S1 in FIG. 2). Here the month m of the processing fiscal year is a whole number that is 4, 5, . . . , 11, 12, 1, 2, and 3, where the location number p is a whole number from 1 through P (where P is the number of applicable locations), and the energy type number n is a whole number from 1 through N (where N is the number of types of energy that is subject to processing).

The confirmed data evaluating portion 2 evaluates, for each data, whether or not all of the data E(Y, m, p, n) that has been extracted by the data extracting portion 1 is confirmed data, and, for each individual data, sets a confirmed data flag Cf(Y, m, p, n) (Step S2 in FIG. 2). Here Cf(Y, m, p, n)=0 indicates confirmed data and Cf(Y, m, p, n)=1 indicates non-confirmed data.

While evaluation criteria for whether or not data is confirmed data is set in advance depending on the system specifications, in the present form of embodiment, which envisions a typical system wherein data approval by an approving party is required, the evaluation is based on information has to whether or not approval has been completed, which is controlled in relation to the data for the amounts of energy used. That is, if the data E(Y, m, p, n) has been approved, then Cf(Y, m, p, n) is set to 0, but if the data E(Y, m, p, n) has not yet been approved (including cases wherein it has not yet been entered), then Cf(Y, m, p, n) is set to 1.

Following this, the calculation data generating portion 3 generates the calculation data Ecal(Y, m, p, n) (Step S3 in FIG. 2). If substitute data for fiscal year Y and month m, location number p, and energy type number n that are subject to processing is defined as Esub(Y, m, p, n), then the calculation data Ecal(Y, m, p, n) is generated as given in Equation (1):

If $Cf(Y,m,p,n)=0$ then $Ecal(Y,m,p,n)=E(Y,m,p,n)$

If $Cf(Y,m,p,n)=1$ then $Ecal(Y,m,p,n)=Esub(Y,m,p,n)$ (1)

That is, if the data E(Y, m, p, n) is confirmed data, then the calculation data generating portion 3 defines this data as the calculation data Ecal(Y, m, p, n), but if the data E(Y, m, p, n) is non-confirmed data, then the calculation data generating portion 3 defines the substitute data Esub(Y, m, p, n) as the calculation data Ecal(Y, m, p, n).

The substitute data determining portion 4 determines the substitute data Esub(Y, m, p, n) based on an actual value for the amount of energy used for location number p and energy type number n. In the present example, an average value of the data for the applicable energy type for the applicable location over the three-month period of the same month, the previous month, and the following month, from the previous year is defined as the substitute data Esub(Y, m, p, n). That is, the substitute data determining portion 4 determines the substitute data Esub(Y, m, p, n) as in the following equation:

$Esub(Y,m,p,n)=(E(Y-1,m-1,p,n)+E(Y-1,m,p,n)+E(Y-1,m+1,p,n))/3$ (2)

Note that the substitute data should be data that is based on an actual value for the amount of energy used for the location number p and the energy type number n. Consequently, instead, data E(Y, m−1, p, n) for the previous month in the same year, for example, or data E(Y−1, m, p, n) for the same month in the previous year may be used.

The data calculation processing portion 5 uses the calculation data Ecal(Y, m, p, n), generated by the calculation data generating portion 3, to perform the calculation of the amount of energy used (Step S4 in FIG. 2). The total energy quantity e(Y, m) for a month m (where m is 4, 5, . . . , 11, 12, 1, 2, 3) of the applicable fiscal year Y is the sum of the usage quantities of all of the types of energy for all of the applicable locations, and is calculated as given in Equation (3). Note that in Equation (3), the notations for months k (where k is 7, 8, 9, 10, 11, 12, 1, or 2) are omitted from the total energy quantities e(Y, k).

[Formula 1]

$$e(Y, 4) = \sum_{p=1}^{P} \sum_{n=1}^{N} Ecal(Y, 4, p, n)$$

$$e(Y, 5) = \sum_{p=1}^{P} \sum_{n=1}^{N} Ecal(Y, 5, p, n)$$

$$e(Y, 6) = \sum_{p=1}^{P} \sum_{n=1}^{N} Ecal(Y, 6, p, n)$$

$$\vdots$$

$$e(Y, 3) = \sum_{p=1}^{P} \sum_{n=1}^{N} Ecal(Y, 3, p, n) \qquad (3)$$

Given this, the data calculation processing portion 5 calculates a cumulative total energy quantity Etot(Y, m) from April through month m of the applicable fiscal year Y as in Equation (4). As with Equation (3), in Equation (4) the notations for months k (where k is 7, 8, 9, 10, 11, 12, 1, or 2) are omitted from the cumulative total energy quantity Etot(Y, k).

Etot(Y,4)=e(Y,4)

Etot(Y,5)=e(Y,4)+e(Y,5)

Etot(Y,6)=e(Y,4)+e(Y,5)+e(Y,6)

Etot(Y,3)=e(Y,4)+e(Y,5)+ . . . +e(Y,12)+e(Y,1)+e(Y,2)+e(Y,3)   (4)

Following this, the substitution rate calculating portion 6 calculates the substitution rate, which is the ratio of use of the substitute data in the cumulative total energy quantity Etot(Y, m) (Step S5 in FIG. 2). The substitution rate calculating portion 6 calculates the cumulative total substitute data quantity Etot_sub(Y, m) month m for the applicable year Y according to Equation (5). As with Equation (3), in Equation (5) the notations for months k (where k is 7, 8, 9, 10, 11, 12, 1, or 2) are omitted from the total substitute data quantity e_sub(Y, k).

[Formula 2]

$$e\_sub(Y, 4) = \sum_{p=1}^{P} \sum_{n=1}^{N} (CF(Y, 4, p, n) \times Ecal(Y, 4, p, n))$$

$$e\_sub(Y, 5) = \sum_{p=1}^{P} \sum_{n=1}^{N} (CF(Y, 5, p, n) \times Ecal(Y, 5, p, n))$$

$$e\_sub(Y, 6) = \sum_{p=1}^{P} \sum_{n=1}^{N} (CF(Y, 6, p, n) \times Ecal(Y, 6, p, n))$$

$$\vdots$$

$$e\_sub(Y, 3) = \sum_{p=1}^{P} \sum_{n=1}^{N} (Cf(Y, 3, p, n) \times Ecal(Y, 3, p, n)) \qquad (5)$$

The substitution rate calculating portion 6 calculates the cumulative total substitute data quantity Etot_sub(Y, m) for April through month m for the applicable year Y according to Equation (6). As with Equation (3), in Equation (6) the notations for months k (where k is 7, 8, 9, 10, 11, 12, 1, or 2) are omitted from the cumulative total substitute data quantity Etot_sub(Y, k).

Etot_sub(Y,4)=e_sub(Y,4)

Etot_sub(Y,5)=e_sub(Y,4)+e_sub(Y,5)

Etot_sub(Y,6)=e_sub(Y,4)+e_sub(Y,5)+e_sub(Y,6)

Etot_sub(Y,3)=e_sub(Y,4)+e_sub(Y,5)+ . . . +e_sub(Y,12)+e_sub(Y,1)+e_sub(Y,2)+e_sub(Y,3)   (6)

Following this, the substitution rate calculating portion 6 calculates the substitution rate Rsub corresponding to the cumulative total energy quantity for each month m of the applicable fiscal year Y as follows:

Rsub(Y,m)=Etot_sub(Y,m)/Etot(Y,m)   (7)

The displaying portion 7 displays the cumulative total energy quantity Etot(Y, m) for the applicable fiscal year Y together with the substitution rate Rsub(Y, m) (Step S6 in FIG. 2). The information displayed by the displaying portion 7 may use a table or a graph such as is commonly used in an aggregated display. Moreover, the ratio of use of confirmed data and substitute data should be indicated to the total quantity administrator to enable review of the likelihood of a non-achievement of total energy quantity targets. Consequently, the confirmed data proportion may be calculated instead of the substitute data proportion, and the display need not necessarily be a numeric display, but rather the use proportion may be reviewed through, for example, a method wherein a graph is displayed.

Figure 4:
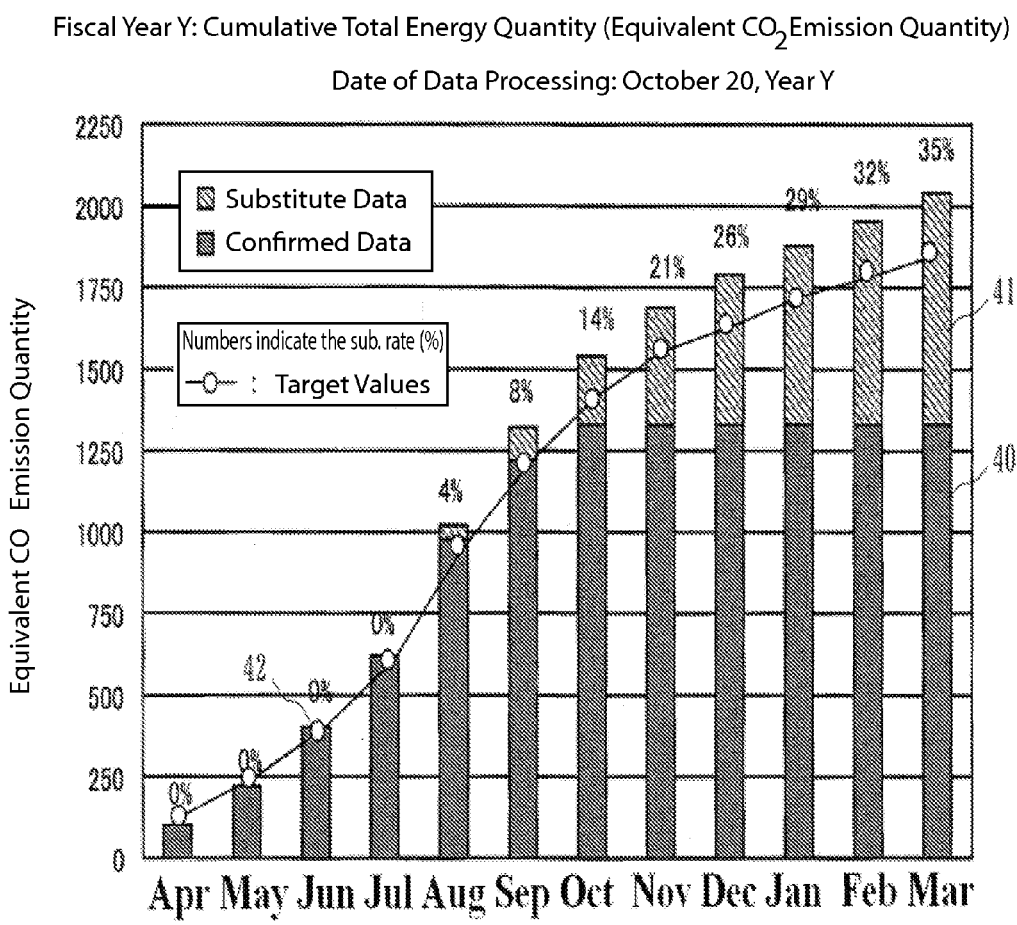
FIG. 4 is a diagram illustrating an example wherein the cumulative total energy quantity is displayed in a graph in the example.

FIG. 3 is a diagram illustrating an example of displaying the cumulative total energy quantities in the form of a table, and FIG. 4 is a diagram illustrating an example of displaying the cumulative total energy quantities in the form of a graph. As described above, the cumulative total energy quantity and the cumulative total substitute data quantity are converted into $CO_2$ emission quantities. In the example in FIG. 3, the cumulative total energy quantity, the cumulative total substitute data quantity, and the substitution rate are displayed.

On the other hand, in the example in FIG. 4, the cumulative total energy quantities for the confirmed data for April through month m and the cumulative total substitute data quantities for April through month m are displayed in the form of a graph, and the target values for the cumulative total energy quantities for April through m are also displayed, and the substitution rates are displayed as numeric values above the graph. In FIG. 4, 40 are cumulative total energy quantities for the confirmed data, 41 are cumulative total substitute data quantities, and 42 are target values. The sums of the cumulative total energy quantities of the confirmed data and the cumulative total substitute data quantities are the cumulative total energy quantities. In the example in FIG. 4, the numeric values for the substitution rates are displayed above the graph; however, the cumulative total energy quantities for the confirmed data and the cumulative total substitute data quantities are displayed as graphs, making it possible to understand visually the proportions with which the confirmed data and the substitute data are used. In this case, the substitution rates need not necessarily be displayed as quantitative values.

As described above, when, in the present example, the total quantity administrator checks the data for the total energy quantity, the data that has already been confirmed is always used in the calculation, and the proportions of use of the confirmed data and the substitute data are indicated in a way that enables review, thus facilitating early forecasting of the likelihood of non-achievement of targets for the total energy quantities, enabling an increase in the likelihood of the ability to research countermeasures promptly if a non-achievement of targets is anticipated. It is necessary for the total quantity administrator to discover, as early as possible, the possibility of the non-achievement of targets, and to structure the required countermeasures, and thus it is effective to produce the calculation results with the timing that is required by the total quantity administrator, even if there are estimated values.

Note that while the present example shows a case wherein the cumulative total energy quantity is aggregated and displayed, conversely the total energy quantities e(Y, m) for each individual month, wherein the amounts of energy used our summed each month, may be calculated and displayed. When the total energy quantities e(Y, m) are calculated for each individual month, the data calculation processing portion 5 executes only Equation (3), and does not execute Equation (4). The substitution rate calculating portion 6 executes only Equation (5), and does not execute Equation (6). Moreover, the substitution rate calculating portion 6 may use Equation (8), below, instead of Equation (7), to calculate a substitution rate Rsub(Y, m) corresponding to a monthly total energy quantity for month m of the applicable fiscal year Y.

$$R\text{sub}(Y,m)=e\_\text{sub}(Y,m)/e(Y,m) \quad (8)$$

Figure 6:
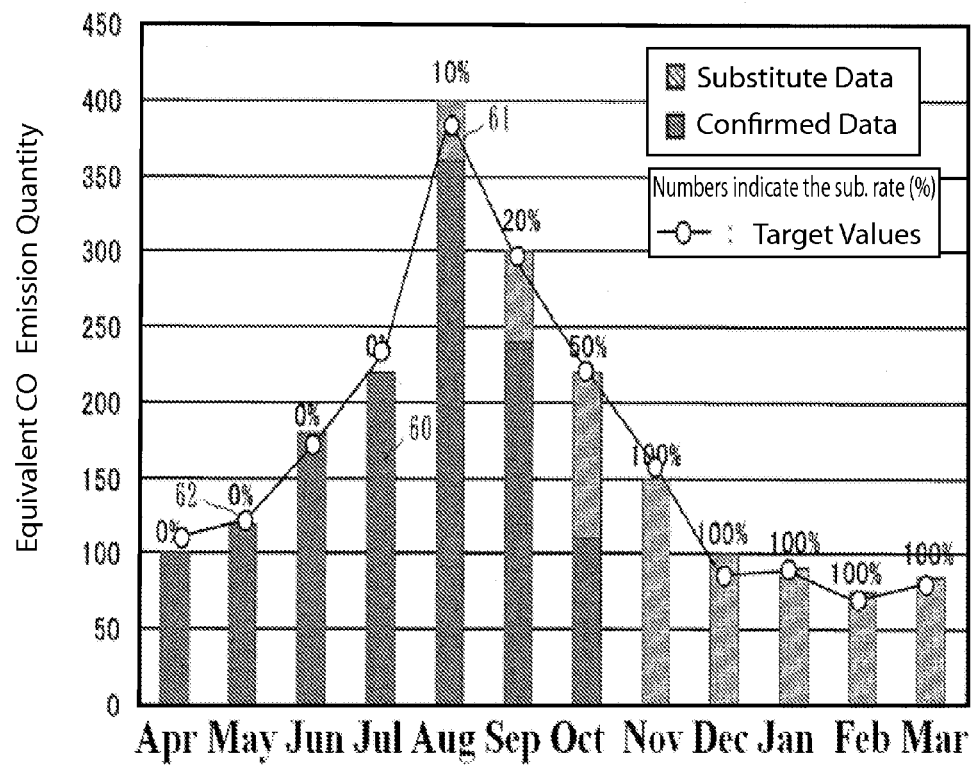
FIG. 6 is a diagram illustrating an example wherein the monthly total energy quantity is displayed in a graph in the example.

FIG. 5 is a diagram illustrating an example wherein the monthly total energy quantities are displayed in the form of a table, and FIG. 6 is a diagram illustrating an example wherein the monthly total energy quantities are displayed in the form of a graph. In the example in FIG. 5, the monthly total energy quantities, monthly total substitute data quantities, and substitution rates are displayed. On the other hand, in the example in FIG. 6 the monthly total energy quantities for the confirmed data from April through month m and the monthly total substitute data quantities for April through month m are displayed in the form of a graph, the target values for the total energy quantities for each month for April through month m are displayed, and the substitution rates are displayed as numeric values above the graph. In FIG. 6, 60 is monthly total energy quantities for confirmed data, 61 is monthly total substitute data quantities, and 62 is target values.

Additionally, the flowchart illustrated in FIG. 2 is, in the end, only an example. For example, there is a method wherein a calculation data table for storing calculation data in advance and a confirmed data table for storing the totals for the confirmed data, which have been approved, for each month are stored in, for example, a memory region of the server, and the confirmed data table is initialized in advance using substitute data. Moreover, the applicable data may be overwritten, in the corresponding column in the calculation data table, at the point in time that the data for the amount of energy used is approved (the point in time at which it becomes confirmed data), and, at the same time, it is added to the final value for the approved and confirmed data for the applicable month to update the value.

When this method is used, the most recent calculation data is always stored in the calculation data table, and the most recent data for the total energy quantity for each month, which uses only confirmed data, is stored in the confirmed data table. This makes it possible to calculate the total energy quantity for each month and the cumulative total energy quantity from the calculation data table, and referencing the values in the confirmed data table makes it possible to check the ratios of the substitute data and the confirmed data for each month, making it possible to calculate the proportions of use. Moreover, the use proportions may be provided to the total quantity administrator together with the aggregate results. As described above, an appropriate flow may be designed depending on the system conditions, and the like.

The present example is an alternate example of the above example, wherein another method for determining the substitute data is provided. As with the above example, values based on actual results are used for the substitute data, but two substitute data, corresponding to upper and lower limit values for the amount of energy used, are established for a single non-confirmed data, enabling the total quantity administrator to know the scope of variation of the estimated value for the total energy quantity.

In the previous example, a method for determining the substitute data was described wherein historic confirmed data were used to determine substitute data, with one confirmed data corresponding to one substitute data. In the present example it is described wherein two types of substitute data are determined corresponding to one non-confirmed data. Two types of substitute data, upper and lower limit values, are determined based on confirmed data from the past, and two types of calculation data are generated corresponding to these substitute data. The ability to forecast flexibly the likelihood of a non-achievement of the total energy quantity target is increased through the total quantity administrator looking at the differences in the two types of calculation results, calculated from the two types of substitute data, namely the upper and lower limit values. For example, if the total energy quantity would exceed the target value even when the lower limit substitute data is used, then it is possible to infer that there is a high likelihood that the target will not be achieved through energy conservation efforts on par with those of the past.

Figure 7:
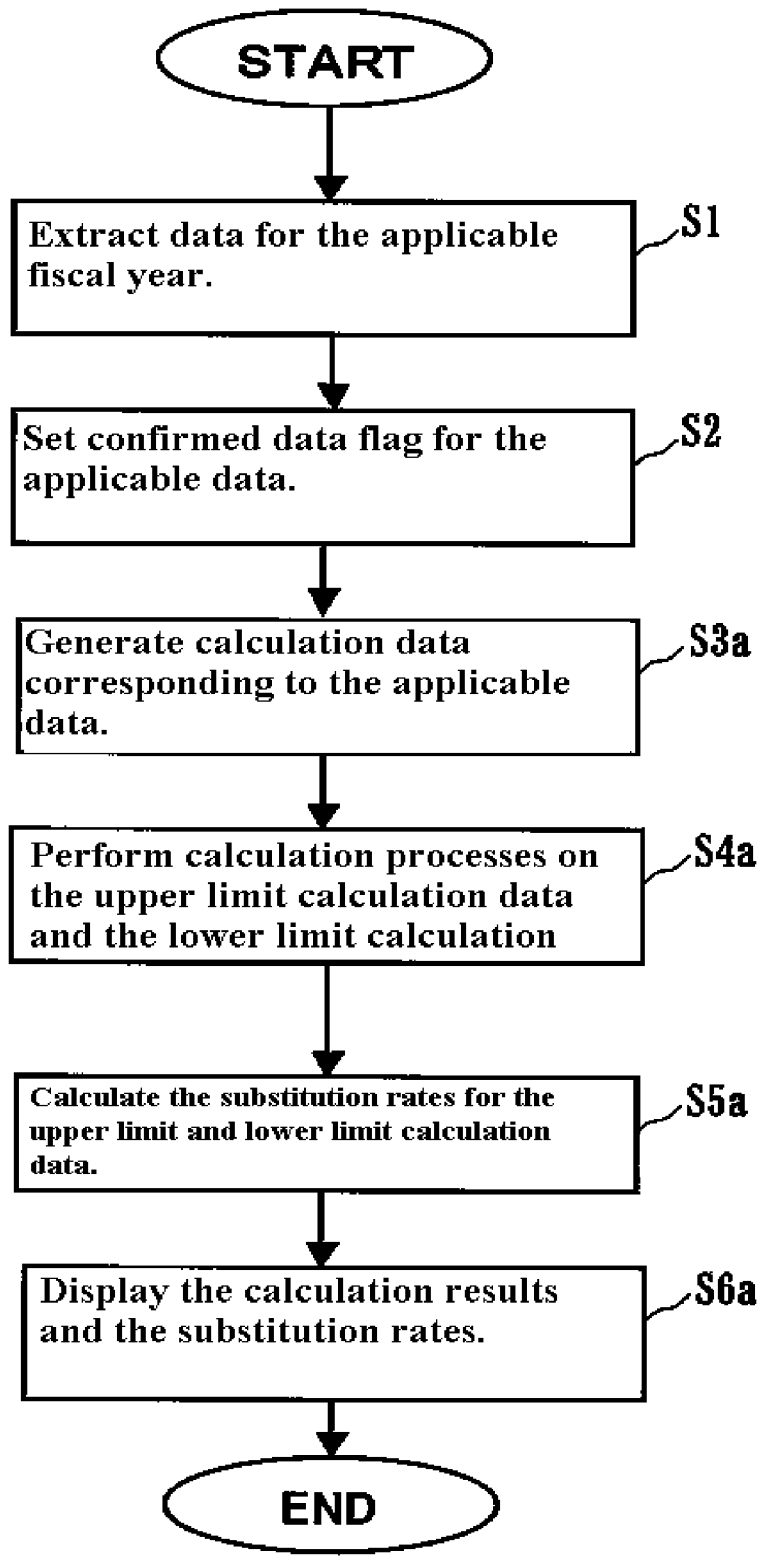
FIG. 7 is a flowchart for explaining the operation of the total energy controlling quantity device according to another example.

In the present example as well, the structure of the total energy quantity controlling device is identical to that in the above example, so the codes in FIG. 1 will be used for the description thereof. FIG. 7 is a flowchart for explaining the operation of the total energy controlling device as set forth in the present example. In the present example, two types of calculation data are generated through determining two types of substitute data, corresponding to upper and lower limit values for the amount of energy used, and calculation processes are performed for each of these two types of calculation data.

The processes in Steps S1 and S2 in FIG. 7 are identical to those in the above example, so explanations thereof are omitted. The calculation data generating portion 3 generates two types of calculation data, namely, an upper limit calculation data Ecal_max(Y, m, p, n) using the upper limit substitute data and a lower limit substitute data Ecal_min(Y, m, p, n) using the lower limit substitute data (Step S3a in FIG. 7).

The method for generating these two types of calculation data is explained below. If the upper limit substitute data and the lower limit substitute data for the fiscal year Y in month m for location number p and energy type number n that are subject to processing are defined, respectively, as Esub_max (Y, m, p, n) and Esub_min(Y, m, p, n), then the upper limit calculation data Ecal_max(Y, m, p, n) and the lower limit calculation data Ecal_min(Y, m, p, n) are generated as in Equation (9).

$$\text{If } Cf(Y,m,p,n)=0 \text{ then } E\text{cal\_max}(Y,m,p,n)=E(Y,m,p,n)$$

$$\text{If } Cf(Y,m,p,n)=1 \text{ then } E\text{cal\_max}(Y,m,p,n)=E\text{sub\_max}(Y,m,p,n)$$

$$\text{If } Cf(Y,m,p,n)=0 \text{ then } E\text{cal\_min}(Y,m,p,n)=E(Y,m,p,n)$$

$$\text{If } Cf(Y,m,p,n)=1 \text{ then } E\text{cal\_min}(Y,m,p,n)=E\text{sub\_min}(Y,m,p,n) \quad (9)$$

That is, if the data E(Y, m, p, n) is confirmed data, then the calculation data generating portion 3 defines this data as the upper limit calculation data Ecal_max(Y, m, p, n) and the lower limit calculation data Ecal_min(Y, m, p, n). Moreover, if the data E(Y, m, p, n) is non-confirmed data, then the calculation data generating portion 3 uses the upper limit substitute data Esub_max(Y, m, p, n) as the upper limit calculation data Ecal_max(Y, m, p, n) and the lower limit substitute data Esub_min(Y, m, p, n) as the lower limit calculation data Ecal_min(Y, m, p, n).

In the same manner as in the above example, the substitute data determining portion 4 determines the upper limit substitute data Esub_max(Y, m, p, n) and the lower limit substitute data Esub_min(Y, m, p, n) based on actual values for the amounts of energy used at location number p for energy type number n. In the present example, the maximum value for the data for the applicable energy type at the applicable location for the three-month period centering on the same month in the previous year is used as the upper limit substitute value data Esub_max(Y, m, p, n), and the minimum value for the data for the three-month period is used as the lower limit substitute data Esub_min(Y, m, p, n). That is, the substitute data determining portion 4 determines the substitute data Esub(Y, m, p, n) as in the following equation:

$E\text{sub\_max}(Y,m,p,n)=\text{MAX}(E(Y-1,m-1,p,n),E(Y-1,m,p,n),E(Y-1,m+1,p,n))$ $E\text{sub\_min}(Y,m,p,n)=\text{MIN}(E(Y-1,m-1,p,n),E(Y-1,m,p,n),E(Y-1,m+1,p,n))$ (10)

Here MAX ( ) means the largest of the values within the parentheses, and MIN ( ) indicates the smallest of the values within the parentheses. The substitute data should be data reflecting the upper and lower limits of the estimated value based on actual values for the amount of energy used of energy type number n for the location number p. For example, the maximum value for the actual values of the amounts of energy used for month m, location number p, and energy type number n over the past several years may be used as the upper limit substitute data Esub_max(Y, m, p, n), and the minimum value of the actual values for the amounts of energy used for the month in, the location number p, and the energy type number n over the past several years may be used as the lower limit substitute data Esub_min(Y, m, p, n).

The data calculation processing portion, 5 performs aggregation of the amounts of energy used, doing so individually for the upper limit calculation data Ecal_max(Y, m, p, n) and the lower limit calculation data Ecal_min(Y, m, p, n), generated by the calculation data generating portion 3 (Step S4a in FIG. 7). First the data calculation processing portion 5 uses the upper limit calculation data Ecal_max(Y, m, p, n) to calculate the total energy quantities for each month. The total energy quantity upper limit e_max(Y, m) for month m of the applicable fiscal year Y is calculated through Equation (11), in the same manner as for Equation (3). Note that in Equation (11), the notations for months k (where k is 7, 8, 9, 10, 11, 12, 1, or 2) are omitted from the total energy quantity upper limit e_max(Y, k).

[Formula 3]

$$e\_\max(Y, 4) = \sum_{p=1}^{P} \sum_{n=1}^{N} E\text{cal\_max}(Y, 4, p, n) \quad (11)$$

$$e\_\max(Y, 5) = \sum_{p=1}^{P} \sum_{n=1}^{N} E\text{cal\_max}(Y, 5, p, n)$$

$$e\_\max(Y, 6) = \sum_{p=1}^{P} \sum_{n=1}^{N} E\text{cal\_max}(Y, 6, p, n)$$

$$\vdots$$

$$e\_\max(Y, 3) = \sum_{p=1}^{P} \sum_{n=1}^{N} E\text{cal\_max}(Y, 3, p, n)$$

First the data calculation processing portion 5 uses the lower limit calculation data Ecal_min(Y, m, p, n) to calculate the total energy quantity lower limits e_min(Y, m) for each month m of the applicable fiscal year Y. The calculating equation for the total energy quantity lower limit e_min(Y, m) is an equation wherein "max" is replaced with "min" in Equation (11), and so the description of the equation is omitted.

Following this, the data calculation processing portion 5 uses the total energy quantity upper limit e_max(Y, m) to calculate the cumulative total energy quantity upper limit Etot_max(Y, m) for April through month m of the applicable fiscal year Y in accordance with Equation (12), using the total energy quantity upper limit e_max(Y, m). As with Equation (11), in Equation (12) the notations for months k (where k is 7, 8, 9, 10, 11, 12, 1, or 2) are omitted from the cumulative total energy quantity upper limit Etot_max(Y, m).

$E\text{tot\_max}(Y,4)=e\_\max(Y,4)$ $E\text{tot\_max}(Y,5)=e\_\max(Y,4)+e\_\max(Y,5)$ $E\text{tot\_max}(Y,6)=e\_\max(Y,4)+e\_\max(Y,5)+e\_\max(Y,6)$ $E\text{tot\_max}(Y,3)=e\_\max(Y,4)+e\_\max(Y,5)+\ldots+e\_\max(Y,12)+e\_\max(Y,1)+e\_\max(Y,2)+e\_\max(Y,3)$ (12)

Moreover, the data calculation processing portion 5 uses the total energy quantity lower limit e_min(Y, m) to calculate the cumulative total energy quantity lower limit Etot_min(Y, m) for April through month m of the applicable fiscal year Y, using the total energy quantity upper limit e_max(Y, m). The calculating equation for the cumulative total energy quantity lower limit Etot_min(Y, m) is an equation wherein "max" is replaced with "min" in Equation (12), above, and so the description of the equation is omitted.

Following this, the substitution rate calculating portion 6 calculates the substitution rate (upper limit substitution rate) that is the ratio of use of substitute data in the cumulative total energy quantity upper limit Etot_max(Y, m) and the cumulative total energy quantity lower limit Etot_min(Y, m) (Step S5a in FIG. 7). First, the substitution rate calculating portion 6 calculates the cumulative total substitute data quantity upper limit e_sub_max(Y, m) for April through month m for the applicable year Y according to Equation (13). As with Equation (11), in Equation (13) the notations for months k (where k is 7, 8, 9, 10, 11, 12, 1, or 2) are omitted from the total substitute data upper limit e_sub_max(Y, m).

[Formula 4]

$$e\_sub\_max(Y, 4) = \sum_{p=1}^{P} \sum_{n=1}^{N} (Cf(Y, 4, p, n) \times Ecal\_max(Y, 4, p, n)) \quad (13)$$

$$e\_sub\_max(Y, 5) = \sum_{p=1}^{P} \sum_{n=1}^{N} (Cf(Y, 5, p, n) \times Ecal\_max(Y, 5, p, n))$$

$$e\_sub\_max(Y, 6) = \sum_{p=1}^{P} \sum_{n=1}^{N} (Cf(Y, 6, p, n) \times Ecal\_max(Y, 6, p, n))$$

$$\vdots$$

$$e\_sub\_max(Y, 3) = \sum_{p=1}^{P} \sum_{n=1}^{N} (Cf(Y, 3, p, n) \times Ecal\_max(Y, 3, p, n))$$

Moreover, the substitution rate calculating portion 6 calculates the total substitute data quantity lower limit e_sub_min(Y, m) for month m for the applicable year Y. The calculating equation for the total substitute data quantity lower limit e_sub_min(Y, m) is an equation wherein "max" is replaced with "min" in Equation (13), and so the description of the equation is omitted.

Following this, the substitution rate calculating portion 6 calculates the cumulative total substitute data quantity upper limit Etot_sub_max(Y, m) for April through month m for the applicable year Y according to Equation (14). As with Equation (11), in Equation (14) the notations for months k (where k is 7, 8, 9, 10, 11, 12, 1, or 2) are omitted from the cumulative total substitute data upper limit Etot_sub_max(Y, m).

$$Etot\_sub\_max(Y,4)=e\_sub\_max(Y,4)$$

$$Etot\_sub\_max(Y,5)=e\_sub\_max(Y,4)+e\_sub\_max(Y,5)$$

$$Etot\_sub\_max(Y,6)=e\_sub\_max(Y,4)+e\_sub\_max(Y,5)+e\_sub\_max(Y,6)$$

$$Etot\_sub\_max(Y,3)=e\_sub\_max(Y,4)+e\_sub\_max(Y,5)+\ldots+e\_sub\_max(Y,12)+e\_sub\_max(Y,1)+e\_sub\_max(Y,2)+e\_sub\_max(Y,3) \quad (14)$$

Moreover, the substitution rate calculating portion 6 calculates the cumulative total substitute data quantity lower limit Etot_sub_min(Y, m) for April through month m for the applicable year Y. The calculating equation for the cumulative total substitute data quantity lower limit Etot_sub_min(Y, m) is an equation wherein "max" is replaced with "min" in Equation (14), and so the description of the equation is omitted.

Following this, the substitution rate calculating portion 6 calculates the upper limit substitution rate Rsub_max corresponding to the cumulative total energy quantity upper limit for each month m of the applicable fiscal year Y and the lower limit substitution rate Rsub_min corresponding to the cumulative total energy quantity lower limit for each month m of the applicable fiscal year Y as follows as follows:

$$Rsub\_max(Y,m)=Etot\_sub\_max(Y,m)/Etot\_max(Y,m)$$

$$Rsub\_min(Y,m)=Etot\_sub\_min(Y,m)/Etot\_min(Y,m) \quad (15)$$

The displaying portion 7 displays the cumulative total energy quantity upper limit Etot_max(Y, m) and the cumulative total energy quantity lower limit Etot_min(Y, m) for the applicable fiscal year Y together with the substitution rate Rsub(Y, m) (Step S6a in FIG. 7).

Figure 9:
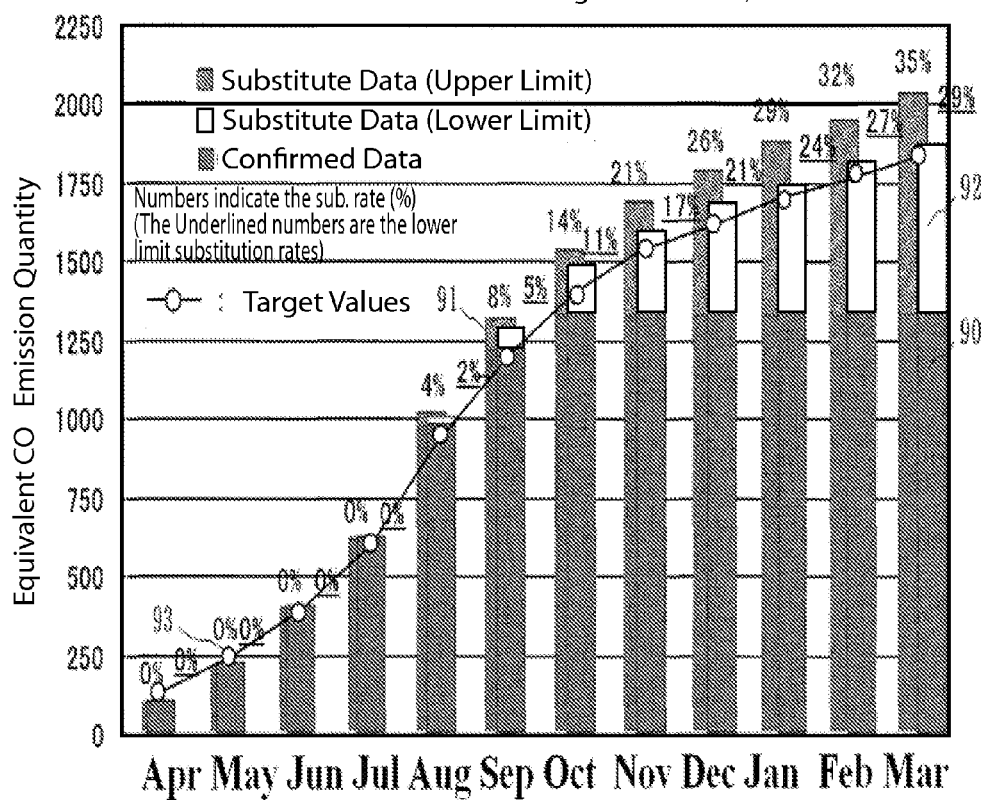
FIG. 9 is a diagram illustrating an example wherein a cumulative total energy quantity upper limit and a cumulative total energy quantity are displayed in a graph in the other example.

FIG. 8 is a diagram illustrating an example wherein a cumulative total energy quantity upper limit and a cumulative total energy quantity are displayed in a table in the other example and FIG. 9 is a diagram illustrating an example wherein a cumulative total energy quantity upper limit and a cumulative total energy quantity are displayed in a graph in this example. In FIG. 8, the cumulative total energy quantity upper limit, cumulative total substitute data quantity upper limit, and upper limit substitution rate, and the cumulative total energy quantity lower limit, cumulative total substitute data quantity lower limit, and lower limit substitution rate are displayed. The cumulative total energy quantity upper limit, the cumulative total substitute data quantity upper limit, the cumulative total energy quantity lower limit, and the cumulative total substitute data quantity lower limit are converted into $CO_2$ emission quantities.

On the other hand, in the example in FIG. 9, the cumulative total energy quantity upper limit and the cumulative total energy quantity lower limit for the confirmed data for April through month m and the cumulative total substitute data quantities for April through month m are displayed in the form of a graph, and the target values for the cumulative total energy quantities for April through m are also displayed, and the upper limit substitution rates and lower limit substitution rates are displayed as numeric values above the graph. In FIG. 9, 90 are cumulative total energy quantities for the confirmed data, 91 are cumulative total substitute data quantity upper limits, 92 are cumulative total substitute data quantity lower limits, and 93 are target values. Note that in the example in FIG. 9, the numeric values that are underlying are the lower limit substitution rates.

As described above, in the present example it is possible for the total quantity administrator to forecast flexibly the likelihood of a non-achievement of the total energy quantity targets, through looking at the two types of calculation results calculated from the two types of substitute data, namely the upper and lower limits. That is, if the total energy quantity would exceed the control target value even when the lower limit substitute data is used, then it is possible to infer that there is a high likelihood that the target will not be achieved through energy conservation efforts on par with those of the past, and thus it is possible to infer that it would be better to investigate adding energy conservation countermeasures different from those in the past in order to achieve the total energy quantity targets.

Note that because the substitution rate is for checking the proportions with which the confirmed data and the substitute data are used, when the upper limit substitution rate and the lower limit substitution rate are displayed simultaneously, as in the case in the present example, to enable a comparison, only one or the other, the upper limit substitution rate or the lower limit substitution rate, need be checked. Moreover, when it is possible to confirm visually the proportions of use in, for example, a graphic display, detailed displays with numeric values for the substitution rates, as in FIG. 9, may be omitted.

Moreover, when the upper limit substitution rate or the lower limit substitution rate, but not both, is displayed, and when a comparison of one of the substitute data is shown using the reference for the substitution rate calculation, the difference between of the upper and lower limits of the data used as the estimated value can be checked with the same reference. The substitution rate calculating portion 6 calculates the upper limit substitution rate Rsub_max(Y, m) in the same manner as with, for example, Equation (15), and the lower limit substitute data rate Rsub_min_emax(Y, m), that is the ratio of the cumulative total energy quantity lower limit using the cumulative total energy quantity upper limit Etot_max(Y, m) as the reference value, in common with the upper limit substitute ratio Rsub_max(Y, m), is calculated as follows:

$$R\text{sub\_max}(Y,m)=E\text{tot\_sub\_max}(Y,m)/E\text{tot\_max}(Y,m)$$

$$R\text{sub\_min\_emax}(Y,m)=E\text{tot\_sub\_min}(Y,m)/E\text{tot\_max}(Y,m) \quad (16)$$

The displaying portion 7 may display the upper limit substitution rate Rsub_max(Y, m) and the lower limit substitute data rate Rsub_min_emax(Y, m), calculated by Equation (16). An example display for this case is given in FIG. 10. In the example in FIG. 10, the cumulative total energy quantity from April through month m for the confirmed data, the cumulative total substitute data quantity lower limit for April through month m, and the difference between the cumulative total substitute data quantity upper limit and the cumulative total substitute data quantity lower limit are displayed in the form of a graph, the target value for the cumulative total energy quantity for April through month m is displayed, and the lower limit substitute data rate and upper limit substitute data rate are displayed above the graph as numeric values.

Figure 10:
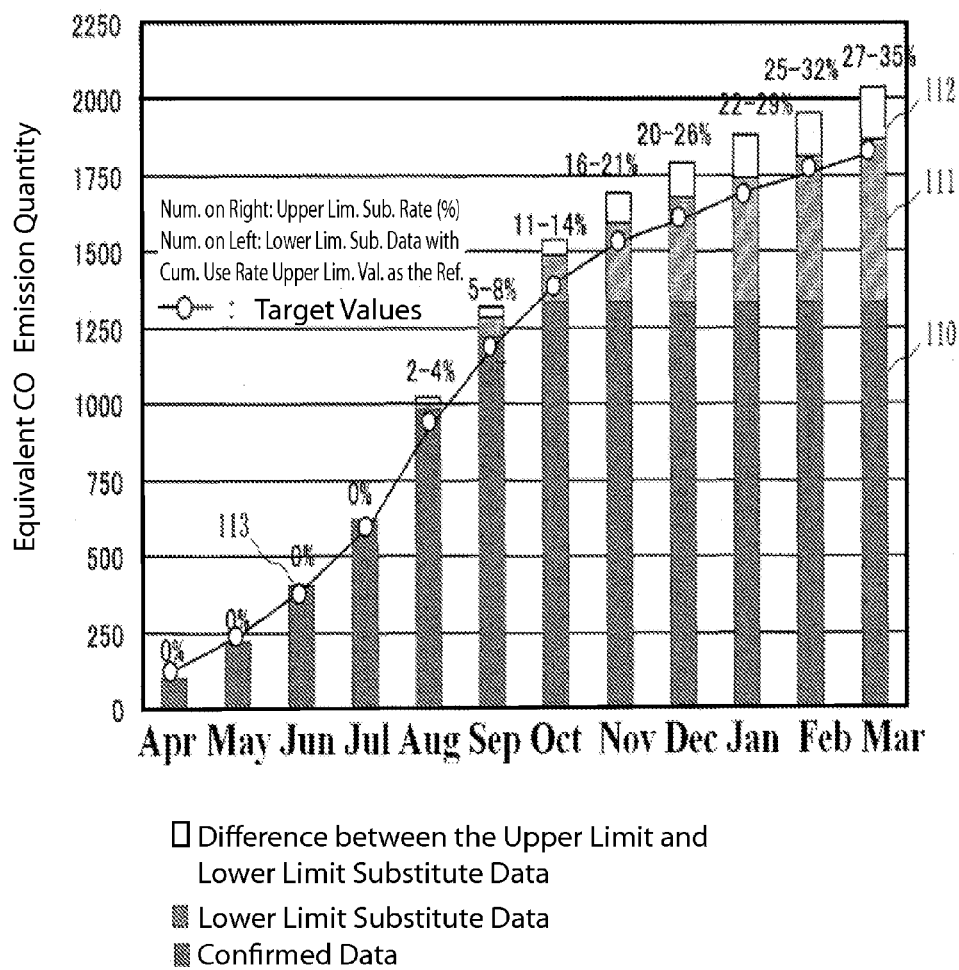
FIG. 10 is a diagram illustrating another example wherein a cumulative total energy quantity upper limit and a cumulative total energy quantity are displayed in a graph in the other example.

In FIG. 10, 110 is the cumulative total energy quantity for the confirmed data, 111 is the cumulative total substitute data quantity lower limits, 112 is the difference between the cumulative total substitute data quantity upper limit and the cumulative total substitute data quantity lower limits, and 113 is the target values. Note that in the example in FIG. 10, of the numeric values displayed above the graph, the numbers on the left side of the hyphens are the lower limit substitute data rates and the numbers on the right sides of the hyphens are upper limit substitution rates. Displaying as illustrated in FIG. 10 enables the total quantity administrator to check the appropriateness of energy used in the past through the position of the target value and the width of the variation of the upper and lower limits of the substitute data (which is the difference between the upper limit substitution rate and the value of the lower limit substitute data rate, which is a data range based on actual results in the past).

A further example is explained next. The present example is an alternate example of the above examples, wherein another method for determining the substitute data is provided. In the present example, the reliability of the data is improved through a substitute data extracting stage. That is, if when determining substitute data for month m for location number p and energy type number n, there is confirmed data for the amount of energy used in a different energy type for the applicable location for the applicable month, then a month and year in the past having a similar usage quantity for this energy type is retrieved and the actual value for the amount of use of energy for the energy type number n for the year and month retrieved is used as the substitute data. Doing so makes it possible for the present example to improve the reliability of the substitute data.

Figure 11:
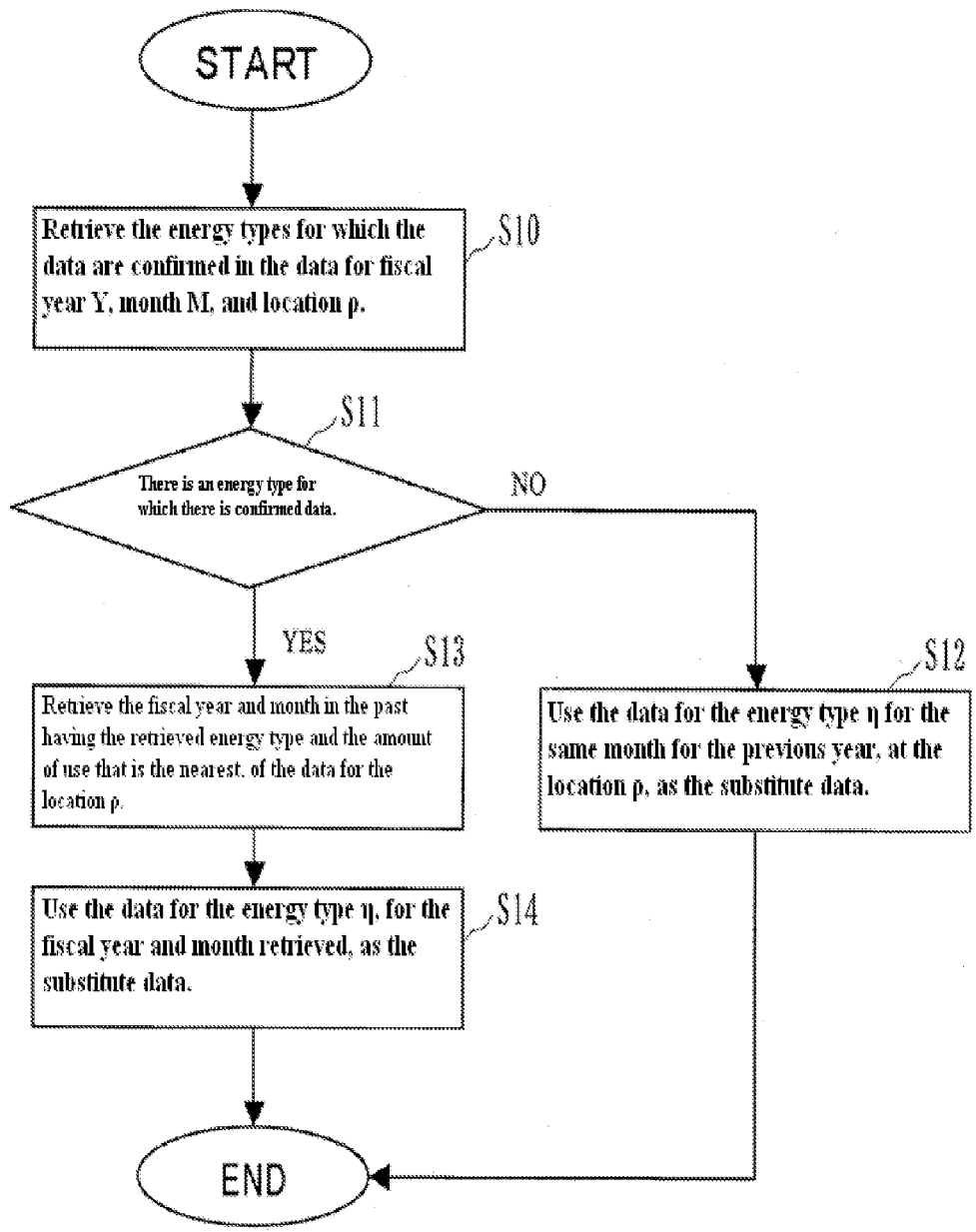
FIG. 11 is a flowchart for explaining a substitute data determining process in the total energy quantity controlling device according to a further example.

In the present example as well, the structure of the total energy quantity controlling device is identical to that in the above examples, so the codes in FIG. 1 will be used for the description thereof. FIG. 11 is a flowchart for explaining the substitute data determining process in the total energy controlling device as set forth in the present example. Note that the present example explains one example of a substitute data determining process that is executed by the substrate data determining portion 4, that is, one example of a process for determining the substitute data Esub(y, m, p, n) in Equation (1). The overall process flow in the total energy controlling device is identical to that of the prior examples, so only the substitute data determining process is explained.

Here an example will be explained wherein there are N types of energy types (such as, for example, electricity, gas, oil, or the like) that are subject to the total energy quantity control, and the substitute data Esub(Y, M, ρ, η) is determined for an arbitrary applicable year and month Y and M, location number ρ, and energy type η.

First, the substitute data determining portion 4 searches in the range of energy type numbers n=1 through N for the values of the confirmed data flag (Y, M, ρ, n) corresponding to the applicable year and month Y and M and location number ρ, that is, retrieves the energy numbers of the confirmed data from the data for the amounts of energy used at location numbers ρ for the applicable year and month Y and M (Step S10 in FIG. 11).

If there is no energy type number for which Cf(Y, M, ρ, n)=0 (NO in Step S11 in FIG. 10), then the substitute data determining portion 4 applies, for example, the substitute data determining method as illustrated in the above examples. For simplicity in the explanation, here the substitute data is confirmed data for the same month in the previous year (Step S12 in FIG. 11). At this time, the substitute data determining portion 4 determines the substitute data Esub(Y, M, ρ, η) as follows:

$$E\text{sub}(Y,M,\rho,\eta)=E(Y-1,M,\rho,\eta) \quad (17)$$

If there is an energy number type ζ which Cf(Y, M, ρ, n)=0 (YES in Step S11 in FIG. 11), then the confirmed data corresponding thereto is the E(Y, M, ρ, ζ). Note that if there is a plurality of energy type numbers for which the Cf(Y, M, ρ, n)=0, then the substitute data determining portion 4 may select one of these energy type numbers as the energy type number.

Following this, the substitute data determining portion 4 uses the historic confirmed data for the energy type number ζ to retrieve the data that is nearest to the confirmed data E(Y, M, ρ, ζ) (Step S13 in FIG. 3). This confirmed data retrieval may be, for example, through calculating an evaluation function S(y, m) such as in Equation (18) for all fiscal years y and all months m wherein there is confirmed data for the location number ρ and the energy type number ζ, for example, and then retrieving the fiscal year and month y and m wherein the evaluation function S(y, m) is the smallest value (positive value) near zero. Note that while all years y and months m for which there is confirmed data for the location number ρ and the energy type number ζ Are subject to searching and retrieval, the scope of the search may be set as, appropriate such as, for example, limiting to the last five years.

$$S(y,m)=(E(y,m,\rho,\zeta)-E(Y,M,\rho,\zeta))^2 \quad (18)$$

If the fiscal year retrieved in Step S13 is Ys and the month retrieved in Step S13 is Ms, then the substitute data determining portion 4 defines the confirmed data E(Ys, Ms, ρ, η) for the fiscal year Ys, the month Ms, the location number ρ, and the energy type number η, as the substitute data Esub(Y, M, ρ, η), as shown below (Step S14 in FIG. 11).

$$E\text{sub}(Y,M,\rho,\eta)=E(Ys,Ms,\rho,\eta) \quad (19)$$

As described above, in the present example, confirmed data for another energy type is used to retrieve a historic fiscal year and month that is estimated to have an energy use environment that is similar to that of the applicable month, and the data for the applicable energy type for the fiscal year and month that have been retrieved is defined as the substitute data for the applicable month. As a result, in the present invention it is possible to improve the reliability of the substitute data through the ability to reduce the probability that aberrant data that depends on a year with a cold winter or a hot summer, or the like, or data for a month with a unique usage conditions, will be used as the substitute data, when compared to the case of defining, as substitute data, confirmed data from the previous month or from the same month in the previous year.

Note that while in the present example, for simplicity in the explanation, if there was a plurality of energy type numbers for which Cf(Y, M, ρ, η)=0, then any one of these energy type numbers may be selected as the energy type number; however, instead all of the actual values for the plurality of energy types may be evaluated, and the most similar fiscal year and month may be retrieved. In this case, an evaluation function S(y, m) such as the following may be used:

$$S(y,m)=(E(y,m,\rho,\eta')-E(Y,M,\rho,\zeta'))^2+(E(y,m,\rho,\zeta'')-E(Y,M,\rho,\zeta''))^2+(E(y,m,\rho,\zeta''')-E(Y,M,\rho,\zeta'''))\quad(20)$$

Note that here $\zeta'$, $\zeta''$, and $\zeta'''$ are energy type numbers for which Cf(Y, M, ρ, n) is 0.

A yet another example is explained next. In the present example, the substitute data determining method that is executed is selected by the total quantity administrator from a plurality of substitute data determining methods. When it is possible for the total quantity administrator to select the desired substitute data determining method from among the substitute data determining methods of the previous examples, then it will be possible to use the substitute data determining method that, experimentally, has the highest reliability, and to compare the calculation results through the various different substitute data determining methods, increasing the likelihood that it will be possible to estimate flexibly the likelihood of non-achievement of the total energy quantity target.

Figure 12:
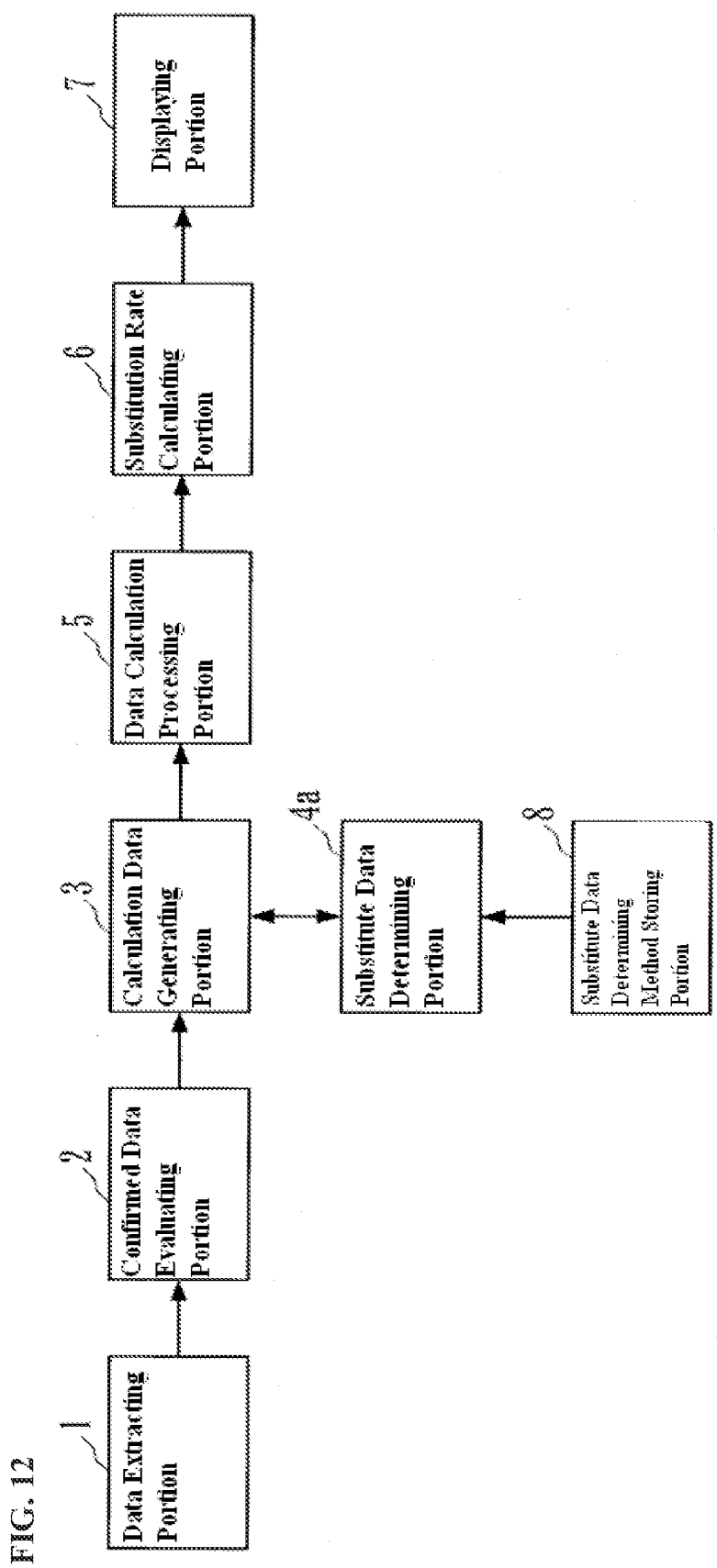
FIG. 12 is a block diagram illustrating a structure of a total energy quantity controlling device according to yet another example.

FIG. 12 is a block diagram illustrating a structure of a total energy controlling device according to the present example. The total energy quantity controlling device includes a data extracting portion 1, a confirmed data evaluating portion 2, a calculation data generating portion 3, a substitute data determining portion 4a, a data calculation processing portion 5, a substitution rate calculating portion 6, a displaying portion 7, and a substitute data determining method storing portion 8. This type of total energy controlling device, in the system in FIG. 16, is provided in a server 102.

The substitute data determining method storing portion 8 stores the types of substitute data determining methods that are compatible with the substitute data determining portion 4a, and the substitute data determining method selected by the total quantity administrator. The total quantity administrator selects the substitute data determining method to be used from these types of substitute data determining methods.

FIG. 13 illustrates an example of a selecting screen for the substitute data determining methods presented to the total quantity administrator. The total quantity administrator selects the desired substitute data determining method on a selecting screen such as in FIG. 13. The substitute data determining method selected by the total quantity administrator is stored in the substitute data determining method storing portion 8.

The substitute data determining portion 4a references the substitute data determining method storing portion 8 to check the substitute data determining method selected by the total quantity administrator, to determine the substitute data using the selected substitute data determining method. The details of the substitute data determining methods have been explained in the above examples, and thus explanations are omitted here.

Moreover, the other structures in the total energy quantity controlling device are identical to those in the previous examples, so explanations thereof are omitted.

As described above, in the present example, the total quantity administrator is able to select appropriately a substitute data determining method evaluated as being appropriate to evaluating the amounts of energy used in the locations being controlled, based on past experience with total energy quantity control. Moreover, in the present example, the display results using different substitute data determining methods can be compared to increase the likelihood of being able to forecast the likelihood of non-achievement of total energy quantity targets more flexibly.

In this example, the locations are grouped in accordance with criticality levels for the achievement of targets, and substitute data determining methods are selected for individual groups. Doing so makes it possible, in this example to support forecasting of likelihoods of non-achievement of targets taking into consideration tolerance for risk in relation to the non-achievement of targets.

In the above examples, the same substitute data determining method was applied for all of the controlled locations. However, there may be, within the locations controlled by the total quantity administrator, Type 1 and Type 2 control specification factories requiring strict target control, or locations where relatively lax energy conservation control may be acceptable, such as in a small office. Moreover, there may be controlled locations that have succeeded in reducing energy consumption through diligent efforts in energy conservation, and controlled locations wherein one may wish to promote further progress in energy conservation. In other words, in addition to compliance with the law, there may be, depending on the policies adopted in the firm regarding energy conservation, differences in the level of criticality for which control is required depending on the controlled location.

Because of this, the controlled locations may be grouped according to the levels of criticality regarding the achievement of energy conservation targets determined by the firm, to enable selection of a substitute data determining method corresponding to a group for which the target achievement is required critically (hereinafter termed a "critical group"). Doing so makes it possible to store, as groups, groups of locations for which the target achievement is critical, thereby expediting the discovery of the likelihood of a non-achievement of the targets through evaluating the total energy quantity for the case of the upper limit value for the historic results for the amounts of energy used, that is, for the worst-case scenario, while also evaluating the total energy quantities using average values for the actual results from the previous year, or the like, for the amounts of energy used for those groups for which the achievement of targets is not so critical, for which control similar to that from the previous year is appropriate.

In this way, the present example makes it possible to reflect into the evaluation of the total energy quantity a range of tolerance for risk in accordance with the level of criticality of the achievement of targets. The present example increases the likelihood that it is possible to forecast the likelihood of a non-achievement of the total energy quantity targets more flexibly, depending on the location information. Note that setting basic groups wherein all of the locations are stored, and then specifying the substitute data determining methods according to the basic groups, enables the achievement of the total energy quantity control in parallel for all of the locations as described in the other examples.

Figure 14:
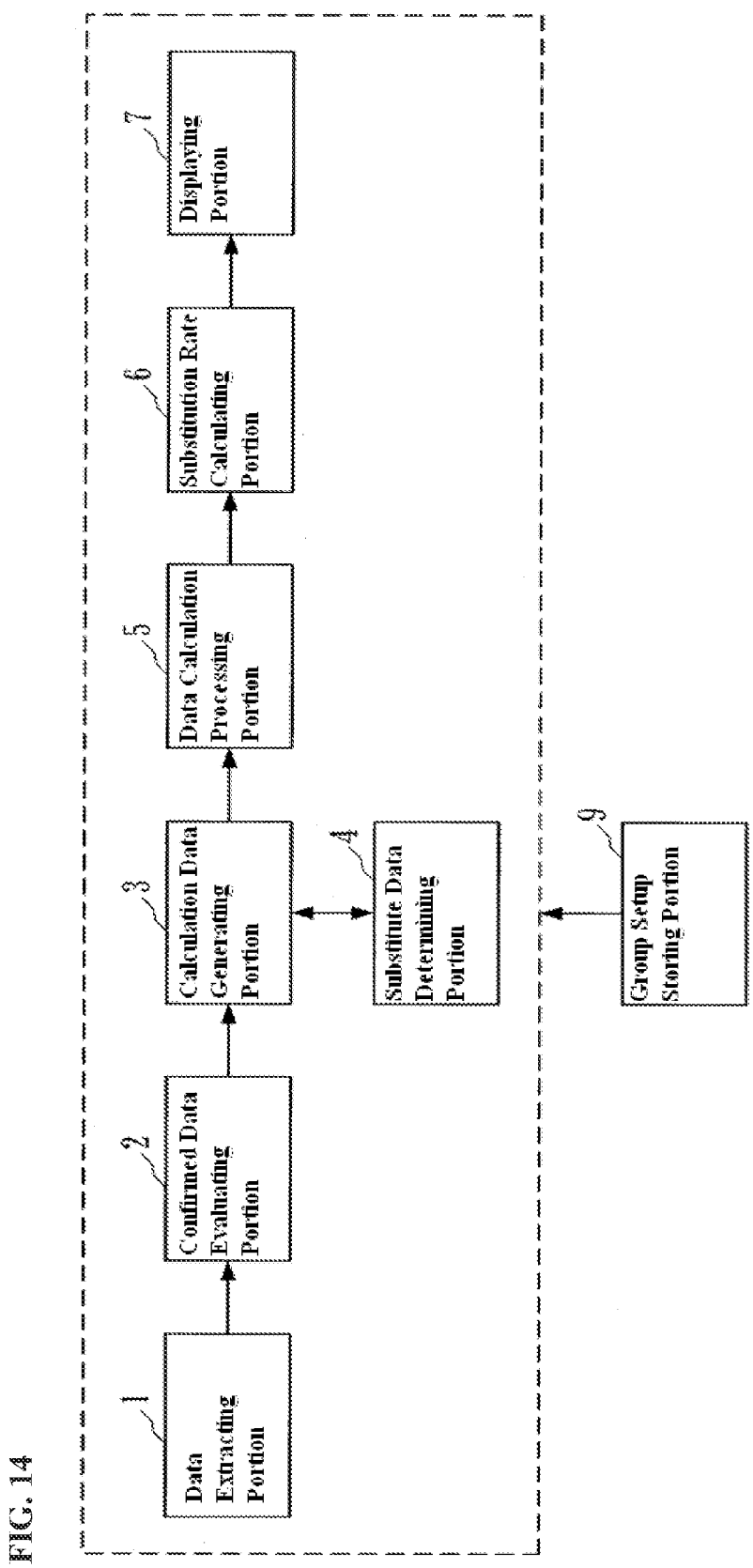
FIG. 14 is a block diagram illustrating a structure of a total energy controlling quantity device according to an example.

FIG. 14 is a block diagram illustrating a structure of a total energy controlling device according to the current example. The total energy quantity controlling device comprises: a data extracting portion 1, a confirmed data evaluating portion 2, a calculation data generating portion 3, a substitute data determining portion 4, a data calculation processing portion 5, a substitution rate calculating portion 6, a displaying portion 7, and a group setup storing portion 9. This type of total energy controlling device, in the system in FIG. 16, is provided in a server 102.

The group setup storing portion 9 stores group information selected by the total quantity administrator on a setup screen such as illustrated in, for example, FIG. 15, and information or the substitute data determining methods selected by the total quantity administrator. The group information comprises information indicating one or more controlled locations belonging to a group.

The data extracting portion 1, the confirmed data evaluating portion 2, the calculation data generating portion 3, the substitute data determining portion 4, the data calculation processing portion 5, the substitution rate calculating portion 6, and the displaying portion 7 perform processing according to the substitute data determining processes selected by the total quantity administrator for the locations in the groups registered by the total quantity administrator, in accordance with the information stored in the group setup storing portion 9. The details of these substitute data determining methods are as explained above.

As described above, the present example makes it possible to group the controlled locations in accordance with the criticality of the achievement of the total energy quantity targets and to select the substitute data determining methods by individual groups, making it possible to take into account the tolerance for risk of non-achievement of targets when forecasting the likelihood of non-achievement of total energy quantity targets.

Note that the total energy quantity controlling devices explained above may be embodied in a computer that is provided with a CPU, a memory device, and an interface, and a program for controlling the hardware resources thereof. The CPU executes the processes explained in the examples, in accordance with a program that is stored in the memory device.

The present invention can be applied to a technology for facilitating the control of the total quantity of energy used at a plurality of locations.

The invention claimed is:

1. A total energy quantity controlling device comprising:
a calculation data generator defining, as calculation data at a point in time during a period of time for aggregating an amount of energy, data of the amount of energy that has been used for a processing energy type at a processing location for a processing month in a processing fiscal year, when this data of the amount of energy is confirmed at the point in time, and defining, as the calculation data at the point in time, substitute data when the data for the amount of energy used is not confirmed at the point in time during the period of time for aggregating the amount of energy;
a substitute data determiner determining the substitute data based on actual values of the amount of energy used in past at the processing location;
a data calculation processor using the calculation data to calculate an aggregate value for the amount of energy used;
a substitution rate calculator calculating a substitution rate that is the use rate of the substitute data or the confirmed data within the aggregate value for the amount of energy used; and
a display displaying the aggregate value for the amount of energy used and the use rate.

2. The total energy quantity controlling device as set forth in claim 1, wherein:
the substitute data determiner determines the substitute data based on confirmed data for the amount of energy used at the processing location for a month prior to the processing month of the processing fiscal year, and/or confirmed data for the amount of energy used at the processing location for the processing month in a year prior to the processing fiscal year.

3. The total energy quantity controlling device as set forth in claim 1, wherein:
the substitute data determiner not only determines, as upper-limit substitute data, a maximum value of the amount of energy used in the past for the processing location, but also determines, as lower-limit substitute data, a minimum value of the amount of energy used in the past for the processing location;
the calculation data generator generates upper-limit calculation data using the upper-limit substitute data and lower-limit calculation data using the lower-limit substitute data;
the data calculation processor calculates the aggregate values for the amounts of energy used for the upper-limit calculation data and the lower-limit calculation data separately; and
the substitution rate calculator calculates an upper-limit substitution rate that is a use rate of the upper-limit substitute data in the aggregate value for the amount of energy used that was calculated using the upper-limit calculation data, and calculate a lower-limit substitution rate that is a use rate of the lower-limit substitute data in the aggregate value for the amount of energy used that was calculated using the lower-limit calculation data.

4. The total energy quantity controlling device as set forth in claim 1, wherein:
the substitute data determiner, if there is confirmed data for another type of energy for the processing location for the processing month for the processing fiscal year when determining substitute data for a processing energy type for a processing location, for a processing month for a processing fiscal year, retrieves a past year and month wherein the amount of energy used in the processing location for the another type of energy is similar, and uses, as the substitute data, the confirmed data for the amount of energy used for the processing energy type, for the year and month that has been retrieved.

5. The total energy quantity controlling device as set forth in claim 1, further comprising:
a substitute data determining method storage storing information for the substitute data determining method selected by a total quantity administrator; wherein:
the substitute data determiner selects a substitute data determining method to be used, in accordance with information stored in the substitute data determining method storage.

6. The total energy quantity controlling device as set forth in claim 1, further comprising:
A group setup storage storing information for a processing group, selected by a total quantity administrator, and information for a substitute data determining method selected for that group by the total quantity administrator; wherein:
the calculation data generator, the substitute data determiner, the data calculation processor, the substitution rate calculator, and the display perform processing on a processing location group, by the selected substitute data determining method, in accordance with information stored in the group setup storage.

7. A total energy quantity controlling method comprising:
a calculation data generating step defining by a calculation data generator, as calculation data at a point in time during a period of time for aggregating an amount of energy, data of the amount of energy that has been used for a processing energy type at a processing location for a processing month in a processing fiscal year, when this data of the amount of energy is confirmed at the point in time, and defining, as the calculation data at the point in time, substitute data when this data for the amount of energy used is not confirmed at the point in time during the period of time for aggregating the amount of energy;
a substitute data determining step determining by a substitute data determiner the substitute data, based on actual values of the amount of energy used in past at the processing location, during the calculation data generating step;
a data calculation processing step using by a data calculation processor the calculation data to calculate an aggregate value for the amount of energy used;
a substitution rate calculating step calculating by a substitute rate calculator a substitution rate that is the use rate of the substitute data or the confirmed data within the aggregate value for the amount of energy used; and
a displaying step displaying by a display the aggregate value for the amount of energy used and the use rate.

8. The total energy quantity controlling method as set forth in claim 7, wherein:
in the substitute data determining step, the substitute data determiner determines the substitute data based on confirmed data for the amount of energy used at the processing location for a month prior to the processing month of the processing fiscal year, and/or confirmed data for the amount of energy used at the processing location for the processing month in a year prior to the processing fiscal year.

9. The total energy quantity controlling method as set forth in claim 7, wherein:
in the substitute data determining step, the substitute data determiner not only determines, as upper-limit substitute data, a maximum value of the amount of energy used in the past for the processing location, but also determines, as lower-limit substitute data, a minimum value of the amount of energy used in the past for the processing location;
in the calculation data generating step, the calculation data generator generates upper-limit calculation data using the upper-limit substitute data and lower-limit calculation data using the lower-limit substitute data;
in the data calculation processing step, the data calculation processor calculates aggregate values for the amounts of energy used for the upper-limit calculation data and the lower-limit calculation data separately; and
in the substitution rate calculating step calculates an upper-limit substitution rate that is a use rate of the upper-limit substitute data in the aggregate value for the amount of energy used that was calculated using the upper-limit calculation data, and calculates a lower-limit substitution rate that is a use rate of the lower-limit substitute data in the aggregate value for the amount of energy used that was calculated using the lower-limit calculation data.

10. The total energy quantity controlling method as set forth in claim 7, wherein:
in the substitute data determining step, if there is confirmed data for another type of energy for the processing location for the processing month for the processing fiscal year when determining substitute data for a processing energy type for a processing location, for a processing month for a processing fiscal year, the substitute data determiner retrieves a past year and month wherein the amount of energy used in the processing location for the another type of energy is similar, and uses, as the substitute data, confirmed data for the amount of energy used for the processing energy type, for the year and month that has been retrieved.

11. The total energy quantity controlling method as set forth in claim 7, wherein:
in the substitute data determining step, the substitute data determiner references a substitute data determining method storage, which stores information for a substitute data determining method that has been selected by a total quantity administrator, to select a substitute data determining method to be used.

12. The total energy quantity controlling method as set forth in claim 7, further comprising:
a processing step performing, by the calculation data generator, the substitute data determiner, the data calculation processor, the substitution rate calculator and the display, referencing a group setup storage that stores information for a processing location group that has been selected by a total quantity administrator and information for a substitute data determining method that has been selected by the total quantity administrator for the group, and processing on the processing location group, by the selected substitute data determining method.

* * * * *